(12) United States Patent
Oehring et al.

(10) Patent No.: US 11,434,737 B2
(45) Date of Patent: Sep. 6, 2022

(54) HIGH HORSEPOWER PUMPING CONFIGURATION FOR AN ELECTRIC HYDRAULIC FRACTURING SYSTEM

(71) Applicant: U.S. Well Services, LLC, Houston, TX (US)

(72) Inventors: Jared Oehring, Houston, TX (US); Brandon N. Hinderliter, Houston, TX (US); Lon Robinson, Houston, TX (US)

(73) Assignee: U.S. Well Services, LLC, Houston, TX (US)

( * ) Notice: Subject to any disclaimer, the term of this patent is extended or adjusted under 35 U.S.C. 154(b) by 0 days.

(21) Appl. No.: 16/871,928

(22) Filed: May 11, 2020

(65) Prior Publication Data

US 2021/0095552 A1 Apr. 1, 2021

Related U.S. Application Data

(63) Continuation of application No. 16/210,749, filed on Dec. 5, 2018, now Pat. No. 10,648,311.
(Continued)

(51) Int. Cl.
    *E21B 43/26* (2006.01)
    *F04B 23/04* (2006.01)
    (Continued)

(52) U.S. Cl.
    CPC .............. *E21B 43/26* (2013.01); *F04D 13/06* (2013.01); *H02J 3/38* (2013.01); *H02P 5/74* (2013.01); *F04D 7/00* (2013.01)

(58) Field of Classification Search
    CPC ........... E21B 43/26; F04B 23/04; F04B 17/03
    See application file for complete search history.

(56) References Cited

U.S. PATENT DOCUMENTS

| 1,541,601 A | 6/1925 | Tribe |
| 1,743,771 A | 1/1930 | Hall |

(Continued)

FOREIGN PATENT DOCUMENTS

| CA | 3067854 A1 | 1/2019 |
| CN | 104117308 A | 10/2014 |

(Continued)

OTHER PUBLICATIONS

Morris et al., U.S. Appl. No. 62/526,869; Hydration-Blender Transport and Electric Power Distribution for Fracturing Operation; Jun. 28, 2018; USPTO; see entire document.

(Continued)

*Primary Examiner* — Kenneth L Thompson
(74) *Attorney, Agent, or Firm* — Hogan Lovells US LLP

(57) ABSTRACT

Embodiments include a hydraulic fracturing system for fracturing a subterranean formation. The system includes an electric pump, arranged on a first support structure, the electric pump coupled to a well associated with the subterranean formation and powered by at least one electric motor, and configured to pump fluid into a wellbore associated with the well at a high pressure so that the fluid passes from the wellbore into the subterranean formation and fractures the subterranean formation. The system also includes support equipment, arranged on a second support structure, electrically coupled to the electric pump, wherein the support equipment includes at least a transformer for distributing power to the electric pump, the power being received from at least one generator at a voltage higher than an operating voltage of the electric pump.

18 Claims, 11 Drawing Sheets

Related U.S. Application Data

(60) Provisional application No. 62/595,411, filed on Dec. 6, 2017, provisional application No. 62/594,925, filed on Dec. 5, 2017.

(51) Int. Cl.
  *F04D 13/06* (2006.01)
  *H02J 3/38* (2006.01)
  *H02P 5/74* (2006.01)
  *F04D 7/00* (2006.01)

(56) References Cited

U.S. PATENT DOCUMENTS

| | | |
|---|---|---|
| 1,967,466 A | 7/1934 | Damsel |
| 2,244,106 A | 6/1941 | Granberg |
| 2,976,025 A | 3/1961 | Pro |
| 3,347,570 A | 10/1967 | Roessler |
| 3,878,884 A | 4/1975 | Raleigh |
| 3,967,841 A | 7/1976 | Kendrick |
| 4,411,313 A | 10/1983 | Johnson et al. |
| 4,442,665 A | 4/1984 | Fick |
| 4,538,916 A | 9/1985 | Zimmerman |
| 4,601,629 A | 7/1986 | Zimmerman |
| 4,768,884 A | 9/1988 | Elkin |
| 4,783,038 A | 11/1988 | Gilbert |
| 5,114,239 A | 5/1992 | Allen |
| 5,293,947 A | 3/1994 | Stratton |
| 5,334,899 A | 8/1994 | Skybyk |
| 5,439,066 A | 8/1995 | Gipson |
| 5,486,047 A | 1/1996 | Zimmerman |
| 5,517,822 A | 5/1996 | Haws et al. |
| 5,549,285 A | 8/1996 | Collins |
| 5,606,853 A | 3/1997 | Birch |
| 5,791,636 A | 8/1998 | Loziuk |
| 5,798,596 A | 8/1998 | Lordo |
| 5,813,455 A | 9/1998 | Pratt et al. |
| 5,894,888 A | 4/1999 | Wiemers |
| 5,950,726 A | 9/1999 | Roberts |
| 6,035,265 A | 3/2000 | Dister et al. |
| 6,097,310 A | 8/2000 | Harrell et al. |
| 6,116,040 A | 9/2000 | Stark |
| 6,121,705 A | 9/2000 | Hoong |
| 6,273,193 B1 | 8/2001 | Hermann et al. |
| 6,315,523 B1 | 11/2001 | Mills |
| 6,406,011 B1 | 6/2002 | Kosar |
| 6,442,942 B1 | 9/2002 | Kopko |
| 6,510,695 B1 | 1/2003 | Fisher |
| 6,585,455 B1 | 7/2003 | Petersen et al. |
| 6,626,646 B2 | 9/2003 | Rajewski |
| 6,765,304 B2 | 7/2004 | Baten et al. |
| 6,788,022 B2 | 9/2004 | Sopko |
| 6,837,910 B1 | 1/2005 | Koshikawa |
| 6,985,750 B1 | 1/2006 | Vicknair et al. |
| 7,170,262 B2 | 1/2007 | Pettigrew |
| 7,279,655 B2 | 10/2007 | Blutke |
| 7,309,835 B2 | 12/2007 | Morrison |
| 7,341,287 B2 | 3/2008 | Gibb |
| 7,494,263 B2 | 2/2009 | Dykstra |
| 7,717,193 B2 | 5/2010 | Egilsson |
| 7,770,396 B2 | 8/2010 | Roby |
| 7,795,830 B2 | 9/2010 | Johnson |
| 7,807,048 B2 | 10/2010 | Collette |
| 7,845,413 B2 | 12/2010 | Shampine |
| 7,900,893 B2 | 3/2011 | Teurlay |
| 7,940,039 B2 | 5/2011 | de Buda |
| 8,146,665 B2 | 4/2012 | Neal |
| 8,221,513 B2 | 7/2012 | Ariyapadi |
| 8,272,439 B2 | 9/2012 | Strickland |
| RE44,444 E | 8/2013 | Dole |
| 8,506,267 B2 | 8/2013 | Gambier et al. |
| 8,556,302 B2 | 10/2013 | Dole |
| 8,616,274 B2 | 12/2013 | Belcher |
| 8,763,387 B2 | 7/2014 | Schmidt |
| 8,789,601 B2 | 7/2014 | Broussard |
| 8,795,525 B2 | 8/2014 | McGinnis et al. |
| 8,905,056 B2 | 12/2014 | Kendrick |
| 8,997,904 B2 | 4/2015 | Cryer |
| 9,051,923 B2 | 6/2015 | Kuo |
| 9,062,545 B2 | 6/2015 | Roberts et al. |
| 9,140,105 B2 | 9/2015 | Pattillo |
| 9,353,593 B1 | 5/2016 | Lu et al. |
| 9,410,410 B2 | 8/2016 | Broussard |
| 9,450,385 B2 | 9/2016 | Kristensen |
| 9,482,086 B2 | 11/2016 | Richardson et al. |
| 9,506,333 B2 | 11/2016 | Castillo et al. |
| 9,534,473 B2* | 1/2017 | Morris ............... E21B 41/0085 |
| 9,706,185 B2 | 7/2017 | Ellis |
| 9,739,546 B2 | 8/2017 | Bertilsson et al. |
| 9,745,840 B2 | 8/2017 | Oehring |
| 9,790,858 B2 | 10/2017 | Kanebako |
| 9,840,901 B2 | 12/2017 | Oehring |
| 9,893,500 B2 | 2/2018 | Oehring |
| 9,903,190 B2 | 2/2018 | Conrad |
| 9,945,365 B2 | 4/2018 | Hernandez et al. |
| 9,970,278 B2 | 5/2018 | Broussard |
| 10,020,711 B2 | 7/2018 | Oehring |
| 10,119,381 B2 | 11/2018 | Oehring |
| 10,184,465 B2 | 1/2019 | Enis et al. |
| 10,221,639 B2 | 3/2019 | Romer et al. |
| 10,254,732 B2 | 4/2019 | Oehring |
| 10,280,724 B2 | 5/2019 | Hinderliter |
| 10,302,079 B2 | 5/2019 | Kendrick |
| 10,337,308 B2 | 7/2019 | Broussard |
| 10,408,030 B2 | 9/2019 | Oehring |
| 10,408,031 B2 | 9/2019 | Oehring |
| 10,415,332 B2* | 9/2019 | Morris ................... H02M 7/00 |
| 10,526,882 B2 | 1/2020 | Oehring |
| 10,627,003 B2 | 4/2020 | Dale et al. |
| 10,648,270 B2 | 5/2020 | Brunty et al. |
| 10,648,311 B2* | 5/2020 | Oehring ................ F04D 13/06 |
| 10,669,471 B2 | 6/2020 | Schmidt et al. |
| 10,686,301 B2 | 6/2020 | Oehring et al. |
| 10,690,131 B2 | 6/2020 | Rashid |
| 10,695,950 B2 | 6/2020 | Igo et al. |
| 10,711,576 B2 | 7/2020 | Bishop |
| 10,731,561 B2 | 8/2020 | Oehring et al. |
| 10,740,730 B2 | 8/2020 | Altamirano et al. |
| 10,767,561 B2 | 9/2020 | Brady |
| 10,781,752 B2 | 9/2020 | Kikkawa et al. |
| 10,794,165 B2* | 10/2020 | Fischer ................... E21B 7/022 |
| 10,934,824 B2 | 3/2021 | Oehring |
| 10,988,998 B2 | 4/2021 | Fischer et al. |
| 11,091,992 B2 | 8/2021 | Broussard |
| 2001/0000996 A1 | 5/2001 | Grimland et al. |
| 2003/0079875 A1 | 1/2003 | Weng |
| 2003/0057704 A1 | 3/2003 | Baten |
| 2004/0045703 A1 | 3/2004 | Hooper et al. |
| 2005/0116541 A1 | 6/2005 | Seiver |
| 2005/0201197 A1 | 9/2005 | Duell et al. |
| 2006/0109141 A1 | 5/2006 | Huang |
| 2007/0125544 A1 | 6/2007 | Robinson |
| 2007/0201305 A1 | 8/2007 | Heilman |
| 2008/0095644 A1 | 4/2008 | Mantei et al. |
| 2008/0164023 A1 | 7/2008 | Dykstra et al. |
| 2008/0217024 A1 | 9/2008 | Moore |
| 2008/0236818 A1 | 10/2008 | Dykstra |
| 2008/0257449 A1 | 10/2008 | Weinstein et al. |
| 2008/0277120 A1 | 11/2008 | Hickie |
| 2008/0288115 A1 | 11/2008 | Rusnak |
| 2009/0068031 A1 | 3/2009 | Gambier |
| 2009/0068301 A1 | 3/2009 | Gambier |
| 2009/0072645 A1 | 3/2009 | Quere |
| 2009/0078410 A1 | 3/2009 | Krenek |
| 2009/0114392 A1 | 5/2009 | Tolman |
| 2009/0153354 A1 | 6/2009 | Daussin |
| 2009/0308602 A1 | 12/2009 | Bruins |
| 2009/0315297 A1 | 12/2009 | Nadeau |
| 2010/0038907 A1 | 2/2010 | Hunt |
| 2010/0193057 A1 | 8/2010 | Garner |
| 2010/0250139 A1 | 9/2010 | Hobbs |
| 2010/0281876 A1 | 11/2010 | Khan |
| 2011/0052423 A1 | 3/2011 | Gambier et al. |
| 2011/0061855 A1 | 3/2011 | Case |

(56) References Cited

U.S. PATENT DOCUMENTS

| | | |
|---|---|---|
| 2011/0081268 A1 | 4/2011 | Ochoa et al. |
| 2011/0110793 A1 | 5/2011 | Leugemors et al. |
| 2011/0175397 A1 | 7/2011 | Amrine |
| 2011/0197988 A1 | 8/2011 | Van Vliet |
| 2011/0241590 A1 | 10/2011 | Horikoshi |
| 2012/0063936 A1 | 3/2012 | Baxter et al. |
| 2012/0112757 A1 | 5/2012 | Vrankovic |
| 2012/0150455 A1 | 6/2012 | Franklin et al. |
| 2012/0152716 A1 | 6/2012 | Kikukawa et al. |
| 2012/0255734 A1 | 10/2012 | Coli |
| 2013/0051971 A1 | 2/2013 | Wyse et al. |
| 2013/0078114 A1 | 3/2013 | Van Rijswick |
| 2013/0138254 A1 | 5/2013 | Seals |
| 2013/0180722 A1 | 7/2013 | Olarte Caro et al. |
| 2013/0189629 A1 | 7/2013 | Chandler |
| 2013/0255271 A1 | 10/2013 | Yu et al. |
| 2013/0284455 A1 | 10/2013 | Kajaria et al. |
| 2013/0299167 A1 | 11/2013 | Fordyce et al. |
| 2013/0306322 A1* | 11/2013 | Sanborn ............... E21B 43/26 166/308.1 |
| 2014/0077607 A1 | 3/2014 | Clarke |
| 2014/0138079 A1 | 5/2014 | Broussard |
| 2014/0174717 A1 | 6/2014 | Broussard |
| 2014/0294603 A1 | 10/2014 | Best |
| 2015/0114652 A1 | 4/2015 | Lestz |
| 2015/0144336 A1 | 5/2015 | Hardin |
| 2015/0147194 A1 | 5/2015 | Foote |
| 2015/0233530 A1 | 8/2015 | Sandidge |
| 2015/0252661 A1 | 9/2015 | Glass |
| 2016/0006311 A1 | 1/2016 | Li |
| 2016/0230660 A1 | 8/2016 | Zeitoun et al. |
| 2016/0258267 A1 | 9/2016 | Payne |
| 2016/0273456 A1 | 9/2016 | Zhang et al. |
| 2016/0290114 A1 | 10/2016 | Oehring |
| 2016/0326853 A1 | 11/2016 | Fred et al. |
| 2016/0326854 A1 | 11/2016 | Broussard |
| 2016/0348479 A1 | 12/2016 | Oehring |
| 2017/0016433 A1 | 1/2017 | Chong |
| 2017/0043280 A1 | 2/2017 | Vankouwenberg |
| 2017/0074076 A1 | 3/2017 | Joseph et al. |
| 2017/0082033 A1 | 3/2017 | Wu et al. |
| 2017/0096889 A1 | 4/2017 | Blanckaert et al. |
| 2017/0138171 A1 | 5/2017 | Richards et al. |
| 2017/0159654 A1 | 6/2017 | Kendrick |
| 2017/0204852 A1 | 7/2017 | Barnett |
| 2017/0212535 A1 | 7/2017 | Shelman et al. |
| 2017/0226838 A1 | 8/2017 | Ceizobka et al. |
| 2017/0226842 A1 | 8/2017 | Omont |
| 2017/0370639 A1 | 12/2017 | Barden et al. |
| 2018/0090914 A1 | 3/2018 | Johnson et al. |
| 2018/0181830 A1 | 6/2018 | Laharuka et al. |
| 2018/0259080 A1 | 9/2018 | Dale et al. |
| 2018/0266217 A1 | 9/2018 | Funkhauser et al. |
| 2018/0284817 A1 | 10/2018 | Cook et al. |
| 2018/0298731 A1 | 10/2018 | Bishop |
| 2018/0312738 A1 | 11/2018 | Rutsch et al. |
| 2018/0313677 A1 | 11/2018 | Warren et al. |
| 2018/0363640 A1 | 12/2018 | Kajita et al. |
| 2018/0366950 A1 | 12/2018 | Pedersen et al. |
| 2019/0040727 A1 | 2/2019 | Oehring et al. |
| 2019/0128104 A1 | 5/2019 | Graham et al. |
| 2019/0145251 A1 | 5/2019 | Johnson |
| 2019/0154020 A1 | 5/2019 | Glass |
| 2019/0249527 A1 | 8/2019 | Kraynek |
| 2019/0257462 A1 | 8/2019 | Rogers |
| 2020/0040878 A1 | 2/2020 | Morris |
| 2020/0047141 A1 | 2/2020 | Oehring et al. |
| 2020/0088152 A1 | 3/2020 | Allion et al. |
| 2020/0325760 A1 | 10/2020 | Markham |
| 2020/0350790 A1 | 11/2020 | Luft et al. |

FOREIGN PATENT DOCUMENTS

| | | |
|---|---|---|
| CN | 104196613 A | 12/2014 |
| CN | 205986303 U | 2/2017 |
| CN | 108049999 A | 5/2018 |
| CN | 112196508 A | 1/2021 |
| WO | 00/47893 | 8/2000 |
| WO | 2009046280 | 4/2009 |
| WO | 2012/051705 | 4/2012 |
| WO | 2014/116761 | 7/2014 |
| WO | 2014/177346 | 11/2014 |
| WO | 2014177346 | 11/2014 |
| WO | 2018044307 A1 | 3/2018 |
| WO | 2018213925 A1 | 11/2018 |
| WO | 2019210417 | 11/2019 |

OTHER PUBLICATIONS

Final Office Action dated Feb. 4, 2021 in U.S. Appl. No. 16/597,014.
International Search Report and Written Opinion dated Feb. 4, 2021 in PCT/US20/59834.
International Search Report and Written Opinion dated Feb. 2, 2021 in PCT/US20/58906.
International Search Report and Written Opinion dated Feb. 3, 2021 in PCT/US20/58899.
Non-Final Office Action dated Jan. 29, 2021 in U.S. Appl. No. 16/564,185.
Final Office Action dated Jan. 21, 2021 in U.S. Appl. No. 16/458,696.
Final Office Action dated Jan. 11, 2021 in U.S. Appl. No. 16/404,283.
Non-Final Office Action dated Jan. 4, 2021 in U.S. Appl. No. 16/522,043.
International Search Report and Written Opinion dated Dec. 14, 2020 in PCT/US2020/53980.
Non-Final Office dated Oct. 26, 2020 in U.S. Appl. No. 15/356,436.
Non-Final Office dated Oct. 5, 2020 in U.S. Appl. No. 16/443,273.
Non-Final Office Action dated Sep. 29, 2020 in U.S. Appl. No. 16/943,727.
Non-Final Office Action dated Sep. 2, 2020 in U.S. Appl. No. 16/356,263.
Non-Final Office Action dated Aug. 31, 2020 in U.S. Appl. No. 16/167,083.
Albone, "Mobile Compressor Stations for Natural Gas Transmission Service," ASME 67-GT-33, Turbo Expo, Power for Land, Sea and Air, vol. 79887, p. 1-10, 1967.
Canadian Office Action dated Sep. 22, 2020 in Canadian Application No. 2,982,974.
International Search Report and Written Opinion dated Sep. 3, 2020 in PCT/US2020/36932.
"Process Burner" (https://www.cebasrt.com/productsloii-gaslprocess-bumer) 06 Sep. 6, 2018 (Sep. 6, 2018), entire document, especially para (Burners for refinery Heaters].
Water and Glycol Heating Systems (https://www.heat-inc.com/wg-series-water-glycol-systems/) Jun. 18, 2018 (Jun. 18, 2018), entire document, especially WG Series Water Glycol Systems.
"Heat Exchanger" (https://en.wikipedia.org/w/index.php?title=Heat_exchanger&oldid=89300146) Dec. 18, 2019 Apr. 2019 (Apr. 18, 2019), entire document, especially para (0001].
Canadian Office Action dated Sep. 8, 2020 in Canadian Patent Application No. 2,928,707.
Canadian Office Action dated Aug. 31, 2020 in Canadian Patent Application No. 2,944,980.
International Search Report and Written Opinion dated Aug. 28, 2020 in PCT/US20/23821.
International Search Report and Written Opinion mailed in PCT/US20/67526 dated May 6, 2021.
International Search Report and Written Opinion mailed in PCT/US20/67608 dated Mar. 30, 2021.
International Search Report and Written Opinion mailed in PCT/US20/67528 dated Mar. 19, 2021.
International Search Report and Written Opinion mailed in PCT/US20/67146 dated Mar. 29, 2021.
International Search Report and Written Opinion mailed in PCT/US20/67523 dated Mar. 22, 2021.

(56) References Cited

OTHER PUBLICATIONS

International Search Report and Written Opinion mailed in PCT/US2020/066543 dated May 11, 2021.
Non-Final Office Action issued in U.S. Appl. No. 14/881,535 dated May 20, 2020.
Non-Final Office Action issued in U.S. Appl. No. 15/145,443 dated May 8, 2020.
Non-Final Office Action issued in U.S. Appl. No. 16/458,696 dated May 22, 2020.
International Search Report and Written Opinion issued in PCT/US2020/023809 dated Jun. 2, 2020.
Karin, "Duel Fuel Diesel Engines," (2015), Taylor & Francis, pp. 62-63, Retrieved from https://app.knovel.com/hotlink/toc/id:kpDFDE0001/dual-fueal-diesel-engines/duel-fuel-diesel-engines (Year 2015).
Goodwin, "High-voltage auxilliary switchgear for power stations," Power Engineering Journal, 1989, 10 pg. (Year 1989).
Kroposki et al., Making Microgrids Work, 6 IEEE Power and Energy Mag. 40, 41 (2008).
Dan T. Ton & Merrill A. Smith, The U.S. Department of Energy's Microgrid Initiative, 25 The Electricity J. 84 (2012), pp. 84-94.
Non-Final Office Action issued in U.S. Appl. No. 16/871,328 dated Dec. 9, 2021.
Non-Final Office Action issued in U.S. Appl. No. 16/943,935 dated Oct. 21, 2021.
Non-Final Office Action issued in U.S. Appl. No. 16/564,186, dated Oct. 15, 2021.
Final Office Action issued in U.S. Appl. No. 16/356,263 dated Oct. 7, 2021.
Non-Final Office Action issued in U.S. Appl. No. 17/060,647 dated Sep. 20, 2021.
Non-Final Office Action issued in U.S. Appl. No. 16/901,774 dated Sep. 14, 2021.
Canadian Office Action issued in Canadian Application No. 3,094,768 dated Oct. 28, 2021.
Non-Final Office Action issued in U.S. Appl. No. 16/871,928 dated Aug. 25, 2021.
Non-Final Office Action issued in U.S. Appl. No. 16/943,727 dated Aug. 3, 2021.
Non-Final Office Action issued in U.S. Appl. No. 14/881,525 dated Jul. 21, 2021.
Non-Final Office Action issued in U.S. Appl. No. 16/404,283 dated Jul. 21, 2021.
Notice of Allowance and Notice of Allowability issued in U.S. Appl. No. 15/829,419 dated Jul. 26, 2021.
Woodbury et al., "Electrical Design Considerations for Drilling Rigs," IEEE Transactions on Industry Applications, vol. 1A-12, No. 4, Jul./Aug. 1976, pp. 421-431.
U.S. Well Services, Inc. files suit against Halliburton Company and Cimarex Energy Co. for patent infringement, Apr. 15, 2021, PR Newswire, https://www.prnewswire.com/news-releases/US-well-services-inc-files-suit-against-halliburton-company-and-cimarex-energy-co-for-patent-infringement-301270118.html, 2 pages.
Services—U.S. Well Services, http://uswellservices.com/services/, accessed Nov. 13, 2021, 10 pages.
Publications, U.S. Depailment of Labor—Occupational Safety and Health Administration, https://web.archive.org/web/20150626140537/https://www.osha.gov/pls/publications/publication.html, 47 pages.
OSHA Publications, U.S. Department of Labor—Occupational Safety and Health Administration, https://web.archive.org/web/20150406054914/https://www.osha.gov/pls/publications/publication.AthruZ?pType=Industry, Jun. 13, 2021, 3 pages.
U.S. Department of Labor—Occupational Safety and Health Administration, https://web.archive.org/web/20150406152927/https://www.osha.gov/, 4 pages.
Steven C. Carlson, Weaponizing IPRs, Landslide, Sep. 22, 2019, 10 pages.
Declaration of Dr. Mark Ehsani, IPR2021-01066, Jul. 2, 2021, 213 pages.
Declaration of Robert Schaaf, IPR2021-01066, Nov. 17, 2021, 43 pages.
U.S. Pat. No. 10,020,711, 250 pages.
U.S. Pat. U.S. Appl. No. 62/323,303, 62 pages.
Amazon.com purchase page for Electrical Engineering Reference Manual for the Electrical and Computer PE Exam, Sixth Edition, https://web.archive.org/web/20070103124447/https:/www.amazon.com/Electrical-Engineering-Reference-Manual-Computer/dp/1888577568/, accessed Jul. 23, 2021, 7 pages.
Public Catalog of the U.S. Copyright Office for search result: electrical engineering reference manual, https://cocatalog.loc.gov/cgi-bin/Pwebrecon.cgi?v1=6&ti=1, 6&Search_Arg=electrical engineering reference manual&Search_Code=TALL&CNT=25&PI . . . , accessed Jul. 21, 2021, 2 pages.
Declaration of Robert Schaaf, IPR2021-01238, Nov. 17, 2021, 38 pages.
John A. Camera, PE, Electrical Engineering Reference Manual for the Electrical and Computer PE Exam, Sixth Edition, 2002, 102 pages.
U.S. Pat. No. 10,526,882, 845 pages.
U.S. Pat. U.S. Appl. No. 62/180,289, 32 pages.
IEEE 100 The Authoritative Dictionary of IEEE Standards Terms Seventh Edition, 2000, 7 pages.
National Electrical Manufacturers Association, NEMA ICS 61800-4 Adjustable Speed Electrical Power Drive Systems, Part 4: General Requirements—Rating Specifications for A.C. Power Drive Systems above 1000 V a.c. and Not Exceeding 35 kV, 2004 22 pages.
Professional Publications, Inc., FE Exam, PE Exam, ARE Exam, and NCIDQ Exam Review / Professional Engineering Licensing, About PPI, https://web.archive.org/web/20031219231426/http://ppi2pass.com:80/catalog/servlet/MyPpi_pg_aboutppi.html, accessed Jul. 22, 2021, 1 page.
Professional Publications, Inc., FE Exam, PE Exam, ARE Exam, and NCIDQ Exam Review / Professional Engineering Licensing, What PPI Customers Say, https://web.archive.org/web/20031226130924/http://ppi2pass.com:80/catalog/servlet/MyPpi_pg_comments-EEcomments.html, accessed Jul. 22, 2021, 2 pages.
Professional Publications, Inc., FE Exam, PE Exam, ARE Exam, and NCIDQ Exam Review / Professional Engineering Licensing, Homepage, https://web.archive.org/web/20040209054901/http://ppi2pass.com:80/catalog/servlet/MyPpi, accessed Jul. 19, 2021, 1 page.
Professional Publications, Inc., FE Exam, PE Exam, ARE Exam, and NCIDQ Exam Review / Professional Engineering Licensing, The PPI Online Catalog, https://web.archive.org/web/20040215142016/http://ppi2pass.com:80/catalog/servlet/MyPpi_ct_MAIN, accessed Jul. 19, 2021, 2 pages.
Professional Publications, Inc., FE Exam, PE Exam, ARE Exam, and NCIDQ Exam Review / Professional Engineering Licensing, Electrical PE Exam Review Products, https://web.archive.org/web/20040214233851/http://ppi2pass.com:80/catalog/servlet/MyPpi_ct_ELECTRICAL, accessed Jul. 19, 2021, 7 pages.
Professional Publications, Inc., FE Exam, PE Exam, ARE Exam, and NCIDQ Exam Review / Professional Engineering Licensing, Instructor's Corner, https://web.archive.org/web/20031219232547/http://ppi2pass.com:80/catalog/servlet/MyPpi_pg_corner-corner.html, accessed Jul. 19, 2021, 2 pages.
Professional Publications, Inc., FE Exam, PE Exam, ARE Exam, and NCIDQ Exam Review / Professional Engineering Licensing, Teaching an Electrical and Computer Engineering PE Exam Review Course, https://web.archive.org/web/20031223100101/http://ppi2pass.com:80/catalog/servlet/MyPpi_pg_corner-teachee.html, accessed Jul. 19, 2021, 2 pages.
Professional Publications, Inc., Electrical Engineering Reference Manual, 12 pages.
Professional Publications, Inc., Books for the FE, PE, FLS and PLS Exams, Spring 2004, http://www.ppi2pass.com/corner/catalog.pdf, 16 pages.
Lionel B. Roe, Practices and Procedures of Industrial Electrical Design, 1972, McGraw-Hill, Inc., Chapter 2: The Basic Electric System, 11 pages.

(56) References Cited

OTHER PUBLICATIONS

Declaration of Duncan Hall, Jul. 23, 2021, https://web.archive.org/web/20031219231426/http://ppi2pass.com:80/catalog/servlet/MyPpi_pg_aboutppi.html, 12 pages.
Declaration of Robert Durham, IPR2021-01315, Aug. 12, 2021, 209 pages.
Declaration of Robert Schaaf, IPR2021-01315, Nov. 19, 2021, 39 pages.
U.S. Pat. No. 9,893,500, 106 pages.
U.S. Pat. No. 9,893,500, 291 pages.
U.S. Pat. Appln. No. 62/323,168, 41 pages.
*U.S. Well Services, Inc. and U.S. Well Services, LLC v Halliburton Company and Cimarex Energy Co.*, Case No. 6:21-cv-00367-ADA, Document 63, Defendants' Claim Construction Brief in Reply to U.S. Well Services, LLC's Responsive Brief, Dec. 2, 2021, 30 pages.
*U.S. Well Services, Inc. v Halliburton Company*, Case No. 6:21-cv-00367-ADA, Civil Docket, accessed Dec. 17, 2021, 14 pages.
*U.S. Well Services, Inc. v Halliburton Company*, Case No. 6:21-cv-00367-ADA, Document 64, Order Resetting Markman Hearing, Dec. 8, 2021, 1 page.
Approved American National Standard, ANSI/NEMA MG Jan. 2011, American National Standard Motors and Generators, Dec. 9, 2021, 636 pages.
Comprehensive Power: Power it Up, Feb. 27, 2013, 28 pages.
Comprehensive Power: Power it Up, Brochure, 26 pages.
Declaration of Robert Schaaf, IPR2021-01316, Nov. 19, 2021, 33 pages.
Declaration of Robert Durham, IPR2021-01316, Aug. 13, 2021, 75 pages.
U.S. Pat. No. 10,280,724, 668 pages.
Declaration of Robert Schaaf, IPR2021-01538, Dec. 28, 2021, 40 pages.
Declaration of Dr. L. Brun Hilbert, Jr., P.E., IPR2021-01538, Sep. 22, 2021, 99 pages.
U.S. Pat. No. 10,408,031, 734 pages.
Maxwell James Clerk 1868, On Governors, Proc. R. Soc. Lond., pp. 16270-283.
Katsuhiko Ogata, Modern Control Engineering: Third Edition, 1997, 2 pages.
49 C.F.R. Part 393 (Oct. 1, 2006), 36 pages.
Gardner Denver, 3" 1502 Male Hammer Union Discharge Flange, 2005, 13 pages.
Donald G. Fink, "Standard Handbook for Electrical Engineers—Thirteenth Edition," 1993, McGraw-Hill Inc., pp. 10-13, 20-21, 20-22, 20-85, 20-20, 20-89, 20-90, 20-91, 22-12, 22-13, 22-14, 22-15 and 22-16.
Email from Michael See on Jun. 10, 2021 regarding API-541 Fourth Edition: Public Availability, 2 pages.
Halliburton, Halliburtion All-Electric Fracturing Reducing Emissions and Cost Brochure, 2021, 6 pages.
IEEE Power Engineering Society, 112 IEEE Standard Test Procedure for Polyphase Induction Motors and Generators, 2004, 87 pages.
*U.S. Well Services, LLC v Tops Well Services, LLC*, Case No. 3:19-cv-237, Document 135, Order, Sep. 22, 2021, 2 pages.
*U.S. Well Services, Inc. and U.S. Well Services, LLC v Halliburton Company and Cimarex Energy Co.*, Case No. 6:21-cv-00367-ADA, Document 56, Defendants' Opening Claim Construction Brief, Oct. 27, 2021, 46 pages.
"Screenshot of USWS Clean Fleet System Video," 1 page.
John Daniel, "8.30 DEP Industry Observations: New Flac Fleet; New Fleet Designs Forthcoming," Daniel Energy Partners, Aug. 30, 2020, 13 pages.
Declaration of Joel N. Broussard, IPR2021-01034, IPR2021-01035, IPR2021-01036, and IPR2021-01037, Oct. 20, 2021, 11 pages.
Declaration of Robert Schaaf, IPR2021-01034, Oct. 20, 2021, 47 pages.
Declaration of Dr. Mark Ehsani, IPR2021-01035, Jun. 18, 2021, 188 pages.
U.S. Pat. No. 9,970,278, 310 pages.
Stan Gibilisco, The Illustrated Dictionary of Electronics: Audio/Video Consumer Electronics Wireless Technology—Eighth Edition, 2001, p. 667.
Declaration of Robert Schaaf, IPR2021-01035, Oct. 20, 2021, 51 pages.
Declaration of Dr. L. Brun Hilbert, P.E., IPR2021-01037 and IPR2021-01038, Jun. 21, 2021, 124 pages.
U.S. Pat. No. 9,745,840, 215 pages.
U.S. Pat. No. 10,408,030, 401 pages.
U.S. Appl. No. 62/242,173, 17 pages.
Declaration of Robert Schaaf, IPR2021-01037, Oct. 20, 2021, 52 pages.
Zeus Electric Pumping Unit, Halliburton, http://www.halliburton.com/en/products/zeus-electric-pumping-unit, 2021, 4 pages.
Declaration of Joel N. Broussard, IPR2021-01038, Oct. 20, 2021, 11 pages.
*LedComm LLC v Signify North America Corporation*, Case No. 6:20-cv-01056-ADA, Civil Docket, accessed Dec. 8, 2021, 11 pages.
*U.S. Well Services, Inc. v Halliburton Company*, Case No. 6:21-cv-00367-ADA, Civil Docket, accessed Dec. 13, 2021, 14 pages.
Declaration of Robert Schaaf, IPR2021-01038, Nov. 10, 2021, 40 pages.
*Transcend Shipping Systems LLC v Mediterranean Shipping Company S.A.*, Case No. 6:21-cv-00040, Document 27, Order of Dismissal with Prejudice, Dec. 7, 2021, 1 page.
Centers for Disease Control and Prevention, NIOSH Numbered Publications, https://web.archive.org/web/20120721180008/http://www.cdc.org/niosh/pubs/all_date_desc_nopubnumbers.html, 2012, 57 pages.
America Invents Act, H.R. Rep. No. 112-98, Jun. 1, 2011, 165 pages.
Declaration of Joel N. Broussard, IPR2021-01065, Oct. 20, 2021, 11 pages.
Declaration of Dr. Robert Durham, IPR2021-01065, Jun. 18, 2021, 138 pages.
Declaration of Robert Schaaf, IPR2021-01065, Nov. 10, 2021, 33 pages.
U.S. Pat. No. 9,410,410, Excerpt—Response to Non-Final Office Action filed Feb. 3, 2016, 57 pages.
U.S. Pat. No. 9,840,901, 216 pages.
U.S. Appl. No. 62/242,566, 34 pages.
Industrial Safety & Hygiene News, OSHA issues hazard alert for fracking and drilling, Jan. 6, 2015, 1 page.
Portfolio Media Inc., A Shift to Sand: Spotlight on Silica Use in Fracking, Law360, https://www.law360.com/articles/366057/print?section=energy, accessed Jun. 10, 2021, 5 pages.
Henry Chajet, "OSHA Issues Alert on Non-Silica Fracking Hazards," Jan. 30, 2015, National Law Review Newsroom, 2 pages.
*U.S. Well Services, LLC, v Voltagrid LLC*, Nathan Ough, Certarus (USA) Ltd., and Jared Oehring, Case No. 4:21-cv-3441-LHR, Document 13, Plaintiff U.S. Well Services, LLC's Motion for Preliminary Injunction and Request for Hearing, Nov. 4, 2021, 311 pages.
U.S. Department of Labor—Occupational Safety and Health Administration, Hydraulic Fracturing and Flowback Hazards Other than Respirable Silica, 27 pages.
U.S. Department of Labor—Occupational Safety and Health Administration, Hazard Alert—Worker Exposure to Silica during Hydraulic Fracturing, 2012, 7 pages.
U.S. Department of Labor—Occupational Safety and Health Administration, OSHA and NIOSH issued hazard alert on ensuring workers in hydraulic fracturing operations have appropriate protections from silica exposure, Jun. 21, 2012, 4 pages.
Occupational Safety and Health Administration—Home, United States Department of Labor, https://web.archive.org/web/20120722160756/http://www.osha.gov/, accessed Jun. 13, 2021, 2 pages.
Industry/Hazard Alerts, United States Department of Labor, https://web.archive.org/web/20120801064838/http://www.osha.gov:80/hazardindex.html, accessed Jun. 13, 2021, 1 page.

(56) References Cited

OTHER PUBLICATIONS

Hazard Alert—Worker Exposure to Silica during Hydraulic Fracturing, United States Department of Labor, https://web.archive.org/web/20120808200919/http://www.osha.gov/dts/hazardalerts/hydraulic_frac_hazard_alert.html, accessed Jun. 13, 2021, 5 pages.
A. Abbott, Crippling the Innovation Economy: Regulatory Overreach at the Patent Office, Regulatory Transparency Project, Aug. 14, 2017, 35 pages.
D. Heidel, Safety and Health Management Aspects for Handling Silica-based Products and Engineered Nanoparticles in Sequences of Shale Reservoir Stimulations Operations, Society of Petroleum Engineers, 2004, 4 pages.
Testimony of Judge Paul R. Michel (Ret.) United States Court of Appeals for the Federal Circuit Before the Subcommittee on Intellectual Property, U.S. Senate Committee on the Judiciary, Jun. 4, 2019, 8 pages.
Bernard D. Goldstein, The Role of Toxicological Science in Meeting the Challenges and Opportunities of Hydraulic Fracturing, 2014, Toxicological Sciences, vol. 139, No. 2, pp. 271-283.
Mike Soraghan, OSHA issues hazard alert for fracking and drilling, E&E, Dec. 10, 2014, 1 page.
*U.S. Well Services, LLC* v *Tops Well Services, LLC and Honghua America, LLC*, Case No. 3:19-cv-00237, Document 72-9, Declaration of Dr. Robert Schaaf, Apr. 24, 2020, 52 pages.
*U.S. Well Services, LLC* v *Tops Well Services, LLC and Honghua America, LLC*, Case No. 3:19-cv-00237 Document 72-9, Declaration of Dr. Robert Schaaf—part 2, Apr. 24, 2020, 128 pages.
*U.S. Well Services, LLC* v *Tops Well Services, LLC and Honghua America, LLC*, Case No. 3:19-cv-00237, Document 72-9, Declaration of Dr. Robert Schaaf—part 3, Apr. 24, 2020, 47 pages.
*U.S. Well Services, LLC* v *Tops Well Services, LLC and Honghua America, LLC*, Case No. 3:19-cv-00237, Document 72, Plaintiff's Opening Claim Construction Brief, Apr. 24, 2020, 37 pages.
*U.S. Well Services, LLC* v *Tops Well Services, LLC and Honghua America, LLC*, Case No. 3:19-cv-00237, Document 1, Plaintiff's Original Complaint, 63 pages.
*U.S. Well Services, LLC* v *Tops Well Services, LLC and Honghua America, LLC*, Case No. 3:19-cv-00237, Document 90, Plaintiff's Opposition to Defendants' Motion for Summary Judgment of Invalidity under 35 USC 112, 30 pages.
*U.S. Well Services, LLC* v *Tops Well Services, LLC and Honghua America, LLC*, Case No. 3:19-cv-00237, Document 116, Hearing on Markman and Summary Judgment via Video Conference before the Honorable Andrew M. Edison Day 1 of 1 Day—Transcript, Jun. 15, 2020, 308 pages.
*Kirsch Research and Development, LLC* v *Tarco Specialty Products, Inc.*, Case No. 6:20-cv-00318-ADA, Document 62, Memorandum Opinion and Order Granting Defendant's Opposed Motion to Stay Pending Inter Partes Review of the '482 Patent [ECF No. 57], Oct. 4, 2021, 6 pages.
*Ledcomm LLC* v *Signfiy North America Corp.*, Signify Holding B.V., and Signify N.V., Case No. 6:20-cv-01056-ADA, Document 24, Scheduling Order, Aug. 13, 2021, 4 pages.
Transcend Shipping Systems, LLC and Hapag-Lloyd AG and Hapag-Lloyd (America) LLC, CMA CGM (America) LLC and CMA CGM S.A., Mediterranean Shipping Company S.A., Case Nos. 6:20-cv-1195-ADA, 6:21-cv-0018-ADA, and 3:21-cv-0040-ADA, Document 19, Proposed Amended Scheduling Order, Aug. 13, 2021, 6 pages.
*U.S. Well Services, Inc. and U.S. Well Services, LLC* v *Halliburton Company and Cimarex Energy Co.*, Case No. 6:21-cv-00367-ADA, Document 51, Agreed Scheduling Order, Sep. 16, 2021, 5 pages.
*U.S. Well Services, Inc. and U.S. Well Services, LLC* v *Halliburton Company and Cimarex Energy Co.*, Case No. 6:21-cv-00367-ADA, Plaintiff's Disclosure of Asserted Claims and Preliminary Infringement Contentions, Jul. 12, 2021, 9 pages.
*U.S. Well Services, Inc. and U.S. Well Services, LLC* v *Halliburton Company and Cimarex Energy Co.*, Case No. 6:21-cv-00367-ADA, Plaintiff U.S. Well Services, LLC's Disclosure of Extrinsic Evidence, Oct. 19, 2021, 10 pages.
*U.S. Well Services, Inc. and U.S. Well Services, LLC* v *Halliburton Company and Cimarex Energy Co.*, Case No. 6:21-cv-00367-ADA, Defendants' Preliminary Invalidity Contentions, Sep. 10, 2021, 193 pages.
*U.S. Well Services, Inc. and U.S. Well Services, LLC* v *Halliburton Company and Cimarex Energy Co.*, Case No. 6:21-cv-00367-ADA, Document 1-8, Exhibit H, Halliburton—All Electric Fracturing Reducing Emissions and Cost, Apr. 15, 2021, 6 pages.
Bill Lockley and Barry Wood, "What do the API Motor/Generator Features Cost and What Do They Buy You?" 2010 IEEE, Paper No. PCIC-2010-22, 10 pages.
American Petroleum Institute, "Form-wound Squirrel-Cage Induction Motors—500 Horsepower and Larger," Jun. 2004, Fourth Edition, ANSI/API Standard 541-2003, 88 pages.
Assignment record of U.S. Pat. No. 9,366,114, accessed Aug. 19, 2021, 2 pages.
ASTM International, "Standard Specification for Steel Bars, Carbon and Alloy, Hot-Wrought, General Requirements" Oct. 13, 2006, 16 pages.
"U.S. Well Services Issues $125.5 Million Convertible Senior Secured PIK Notes, Executes License Agreement with ProFrac Manufacturing, LLC and Finalizes Amendment to Senior Secured Term Loan," Jun. 28, 2021, https://finance.yahoo.com/news/u-well-services-issues-125-203000637.html?guccounter=1, 6 pages.
Declaration of Joel N. Broussard, Case Nos. IPR2021-01032 & IPR2021-01033, Oct. 13, 2021, 9 pages.
Declaration of Dr. Robert Durham, Case Nos. IPR2021-01033, IPR2021-01032 and IPR2021-01034, Jun. 18, 2021, 179 pages.
Declaration of Robert Schaaf, Case Nos. IPR2021-01032 and IPR2021-01033, Oct. 12, 2021, 45 pages.
Declaration of Sylvia D. Hall-Ellis, Ph.D., Case Nos. IPR2021-01032, IPR2021-01033, and IPR2021-01034, Jun. 18, 2021, 173 pages.
Stephen Cary et al, "Electric Rotating Machine Standards Part II: Magnetic Wedge Design & Monitoring Methods," 2011 IEEE, Paper No. PCIC-2011-41, 8 pages.
Janice Hoppe-Spiers, "Deploying Change," Energy & Mining International, Spring 2017, http://www.emi-magazine.com, 5 pages.
Jim Harris, "U.S. Well Services LLC—Energy and Mining Magazine," Energy & Mining International, Oct. 12, 2021, https://www.emi-magazine.com/sections/profiles/1221-us-well-services-llc, 3 pages.
U.S. Pat. No. 8,789,601, 159 pages.
U.S. Pat. No. 9,410,410, 263 pages.
U.S. Pat. No. 10,337,308, 861 pages.
"Clean Fleet Reduces Emissions by 99% at Hydraulic Fracturing Sites," Fluid Power Journal, https://fluidpowerjournal.com/clean-fleet-reduces-emissions/, accessed Sep. 22, 2021, 5 pages.
Gardner Denver, Well Servicing Pump Model GD-2500Q Quintuplex—Operating and Service Manual, Aug. 2005, 46 pages.
"Halliburton Delivers Successful Grid-Powered Frac Operation," https://www.halliburton.com/en/about-us/press-release/halliburton-delivers-first-successful-grid-powered-fracturing-operation, accessed Sep. 27, 2021, 4 pages.
Hart Energy, Hydraulic Fracturing Techbook, 2015, 99 pages.
R. Mistry et al., "Induction Motor Vibrations in view of the API 541—4th Edition," IEEE, accessed Jun. 10, 2021, 10 pages.
"Game-changing hydraulic fracturing technology, reduces emissions by 99%," Intrado Globe News Wire, Oct. 1, 2014, https://www.globenewswire.com/fr/news-release-2014/10/01/670029/10100696/en/Game-changing-hydraulic-facturing-technology-reduces-emissions-by-99.html, 4 pages.
M. Hodowanec et al., "Introduction to API Standard 541, 4th Edition—Form-Wound Squirrel Cage Induction Motors—Larger than 500 Horsepower," 2003, IEEE, Paper No. PCIC-2003-33, 9 pages.
D. Bogh et al., "A User's Guide to Factory Testing of Large Motors: What Should Your Witness Expect," IEEE, accessed Jun. 10, 2021, 8 pages.
Ryan Davis, "Albright Says He'll Very Rarely Put Cases On Hold For PTAB," Law 360, https://www.law360.com/articles/1381597/print?section=ip, 2 pages.
Dani Kass, "Fintiv Fails: PTAB Uses 'Remarkably Inaccurate' Trial Dates," Nov. 2, 2021, Law 360, 1 page.

(56) References Cited

OTHER PUBLICATIONS

Eugene A. Avallone et al., "Marks' Standard Handbook for Mechanical Engineers, 11th Edition," 2007, pp. 3-65, 14-2, 14-3, 14-13, 14-14, 20-91, 22-12, 22-13, 22-14, 22-15, 22-16, 10-3, 20-21,20-22, 20-85, 20-86, 20-89, and 20-90.
T. W. Pascall et al., "Navigating the Test Requirements of API 541 4th Edition," 2007, IEEE, Paper No. PCIC-2007-11, 12 pages.
"Kerr Pumps & FlowVale Awards for Excellence in Well Completion, Northeast 2017—Awarded to: U.S. Well Services," https://www.oilandgasawards.com/winner/northeast-2017-kerr-pumps-flowvale-awards . . . , accessed Oct. 5, 2021, 4 pages.
"New Technology Development Award—General/Products, Northeast 2015—Awarded to: U.S. Well Services, LLC," https://www.oilandgasawards.com/winner/northeast-2015-new-technology-development-award-generalproducts/#, accessed Aug. 23, 2021, 4 pages.
U.S. Well Services, Inc. v. Halliburton Company, Civil Docket for Case # 6:21-cv-00367-ADA, https://ecf.txwd.uscourts.gov/cgi-bin/DktRpt.pl?190912742001885-L_1_0-1, Accessed Nov. 29, 2021, 13 pages.
A. T. Dufresne, "How reliable are trial dates relied on by the PTAB in the Fintiv analysis?" Perkins Coie, 2021, 3 pages.
J. Malinowski et al., "Petrochemical Standards A Comparison Between IEEE 841-2001, API 541, and API 547," 2004, IEEE, Paper No. PCIC-2004-22, 8 pages.
"Petroleum Alumnus and Team Develop Mobile Fracturing Unit that Alleviates Environmental Impact," 2015, LSU, https://www.lsu.edu/eng/news/2015/07/20150713-mobile-fracturing-unit.php, accessed Sep. 22, 2021, 2 pages.
Liz Hampton, "Low-cost fracking offers boon to oil producers, headaches for suppliers," Reuters, Sep. 12, 2019, https://www.reuters.com/article/us-usa-oil-electric-fracturing-focus/low-cost-fracking-offers-boon-to-oil-producers-headaches-for-supplies, 11 pages.
Liz Hampton, "U.S. Well Services files e-frac patent lawsuit against Halliburton, Cimarex Energy," Reuters, Apr. 15, 2021, https://www.reuters.com/business/energy/us-well-services-files-e-frac-patent-lawsuit-against-halliburton-cimarex-energy, 10 pages.
"VZ Environmental Award of Excellence in Environmental Stewardship, Rocky Mountain 2016—Awarded to: U.S. Well Services, LLC," Oil & Gas Awards, 2016, https://www.oilandgasawards.com/winner/rocky-mountain-2016-vz-environmental-award-for-excellence-in-environmental-stewardship, accessed Aug. 23, 2021, 4 pages.
Austin H. Bonnett, "Root Cause Failure Analysis for AC Induction Motors in the Petroleum and Chemical Industry," 2010, IEEE, Paper No. PCIC-2010-43, 13 pages.
Carolyn Davis, "Natural Gas Finding Niche in E-Fracking, But Diesel Still Rules," Sep. 6, 2019, Natural Gas Intel, https://www.naturalgasintel.com/natural-gas-finding-niche-in-e-fracking-but-diesel-still-rules, 9 pages.
Tim Rahill and Michael C. Fousha, "Sorting Out the Overlap," Jan./Feb. 2009, IEEE Industry Applications Magazine, 12 pages.
Jodi Shafto, "Growth in electric-fracking fleets stunted by tight producer budgets," Aug. 6, 2019, S&P Global Market Intelligence, https://wwww.spglobal.com/marketintelligence/en/news-insights/latest-news-headlines/growth-in-electric-fracking-fleets-stunted-by-tight-producer-budgets, accessed Sep. 16, 2021, 4 pages.
A. H. Bonnett et al., "Squirrel Cage Rotor Options for A.C. Induction Motors," IEEE, accessed May 18, 2021, 4 pages.
U.S. Well Services Investor and Analyst Update: Second Quarter 2021 in Review, 2021, 7 pages.
Standing Order Governing Proceedings—Patent Cases, in the United States District Court for the Western District of Texas, Waco Division, filed Nov. 17, 2021, 11 pages.
U.S. Well Services—Services, http://uswellservices.com/services/, accessed Nov. 13, 2021, 10 pages.
Elsevier, "Variable Speed Pumping—A Guide to Successful Applications," 2019, 186 pages.
U.S. Well Services, Inc., and U.S. Well Services, LLC v Halliburton Company, Cimarex Energy Co., Halliburton Energy Services, Inc., and Halliburton US Techologies, Inc., Case No. WA:21-CV-00367-ADA, Document 61, Order Setting Markman Hearing, Nov. 29, 2021, 1 page.
U.S. Well Services, Inc., and U.S. Well Services, LLC v Halliburton Company, Cimarex Energy Co., Halliburton Energy Services, Inc., and Halliburton US Techologies, Inc., Case No. WA:21-CV-00367-ADA, Document 61, Order Resetting Markman Hearing, Dec. 8, 2021, 1 page.
Affidavit of Duncan Hall, Internet Archives on Jun. 7, 2021, https://web.archive.org/web/20120917102614/http:/www.quincieoilfield.com/pdf/3.0%20Gardner%20Denver/2500/GD2500Q%200p%20&%20Service%20Manual.pdf, 76 pages.
The American Heritage Dictionary of the English Language, Fifth Edition, Fiftieth Anniversary, p. 911.
Collins English Dictionary, Twelfth Edition, 2014, p. 1005.
Declaration of Robert Schaaf, IPR2021-01539, Jan. 25, 2022, 37 pages.
Department of Transportation, Federal Motor Carrier Safety Administration, 49 CFR Parts 390, 392 and 393—Parts and Accessories Necessary for Safe Operation; General Amendments; Final Rule, Federal Register, Aug. 15, 2005, vol. 70, No. 156, 49 pages.
U.S. Pat. No. 10,648,311, 1,804 pages.
D. Nedelcut et al., "On-line and Off-line Monitoring-Diagnosis System (MDS) for Power Transformers," IEEE, 2008 International Conference on Condition Monitoring and Diagnosis, Beijing, China, Apr. 21-24, 2008, 7 pages.
Random House Webster's Unabridged Dictionary, Second Edition, 2001, p. 990.
A. B. Lobo Ribeiro et al., "Multipoint Fiber-Optic Hot-Spot Sensing Network Integrated Into High Power Transformer for Continuous Monitoring," IEEE Sensors Journal, Jul. 2008, vol. 8, No. 7, pp. 1264-1267.
Society of Automotive Engineers, SAE J1292: Automobile, Truck, Truck-Tractor, Trailer, and Motor Coach Wiring, 49 CFR 393.28, Oct. 1981, 6 pages.
"StarTech NETRS2321E 1 Port RS-232/422/485 Serial over IP Ethernet Device Server," StarTech, http://www.amazon.com/StarTech-NETRS2321E-RS-232-Serial-Ethernet/dp/B000YN0N0S, May 31, 2014, 4 pages.
"StarTech.com 1 Port RS232 Serial to IP Ethernet Converter (NETRS2321P)," StarTech, http://www.amazon.com/StarTech-com-Serial-Ethernet-Converter-NETRS232IP/dp/B0OFJEHNSO, Oct. 9, 2014, 4 pages.
"TCP/IP Ethernet to Serial RS232 RS485 RS422 Converter," Atc, http://www.amazon.com/Ethernet-Serial-RS232-RS485-Converter/dp/B00ATV2DX2, Feb. 1, 2014, 2 pages.
"SainSmart TCP/IP Ethernet to Serial RS232 RS485 Intelligent Communication Converter," SainSmart, http://www.amazon.com/SainSmart-Ethernet-Intelligent-Communication-Converter/dp/B008BGLUHW, Aug. 17, 2014, 4 pages.
"Global Cache iTach, IP to Serial with PoE (IP2SL-P)," Global Cache, https://www.amazon.com/Global-Cache-iTach-Serial-IP2SL-P/dp/B003BFVNS4/, Oct. 30, 2014, 3 pages.
Declaration of Robert Durham, IPR2022-00074, Nov. 8, 2021, 177 pages.
Declaration of Robert Schaaf, IPR2022-00074, Feb. 17, 2022, 36 pages.
U.S. Pat. No. 10,254,732, 552 pages.
U.S. Pat. U.S. Appl. No. 62/204,331, 22 pages.
Eugene A. Avallone, Marks' Standard Handbook for Mechanical Engineers: 11th Edition, 2007, p. 16-4 and 16-22.
Moxa 802.11 Ethernet to Serial, Moxastore, http://www.moxastore.com/Moxa_802_11_Wi_Fi_Ethernet_to_Serial_s/587.html, May 24, 2016, 1 page.
Project Registration, Moxastore, http://www.moxastore.com, Feb. 15, 2015, 2 pages.
About Us, Moxastore, http://www.moxastore.com/aboutus.asp, Mar. 8, 2015, 1 page.
Nportia5250, Moxastore, http://www.moxastore.com/NPORTIA5250_p/nportia5250.htm.

(56) References Cited

OTHER PUBLICATIONS

Declaration of Duncan Hall, Internet Archive, Oct. 26, 2021, https://web.archive.org/web/20140531134153/http://www.amazon.com/StarTech-NETRS2321E-RS-232-Serial-Ethernet/dp/B000YB0NOS, 43 pages.
Michael Quentin Morton, Unlocking the Earth: A Short History of Hydraulic Fracturing (2013), GeoExpro, vol. 10, No. 6, 5 pages.
Accommodating Seismic Movement, Victaulic Company, 2015, https://web.archive.org/web/20150412042941/http://www.victaulic.com:80/en/businesses-solutions/solutions/accommoda . . . , 2 pages.
Style W77 AGS Flexible Coupling, Victaulic Company 2015, https://web.archive.org/web/20150423052817/http://www.victaulic.com:80/en/products-services/products/style-w77-ags-f . . . , 1 page.
AGS Large Diameter Solutions, Victaulic Company, 2015, https://web.archive.org/web/20150419063052/http://www.victaulic.com:80/en/businesses-solutions/solutions/advanced-gr . . . , 2 pages.
Chiksan Original Swivel Joints, FMC, 1997, 16 pages.
CoorsTek Flowguard Products, 2012, 8 pages.
Declaration of Sylvia D. Hall-Ellis, IPR2022-00610, Feb. 28, 2022, 98 pages.
U.S. Pat. No. 10,119,381, 24 pages.
U.S. Pat. No. 10,934,824, 24 pages.
Flowline Products and Services, FMC Technologies, http://www.fmctechnologies.com, 80 pages.
Gardner Denver, Well Servicing Pump Model GD-2500Q, GD-2500Q-HD, Quintuplex Pumps, Sep. 2011, 45 pages.
Eugene A. Avallone, Marks' Standard Handbook for Mechanical Engineers: 11th Edition, 2007, Section 14, 18 pages.
Mohinder L. Nayyar, Piping Handbook Seventh Edition, McGraw-Hill Handbook, 2000, 77 pages.
Pulsation Dampers, Coorstek, 2014, https://web.archive.org/web/20140919005733/http://coorstek.com/markets/energy_equip . . . , 2 pages.
M. E. Rahman et al., "Wire rope isolators for vibration isolation of equipment and structures—A review," IOP Conference Series Materials Science and Engineering, Apr. 2015, 12 pages.
Victaulic Couplings Vibration Attenuation Characteristics, Victaulic, Publication 26.04, Oct. 2014, 5 pages.
Thorndike Saville, The Victaulic Pipe Joint, Journal of American Water Works Association, Nov. 1922, vol. 9, No. 6, pp. 921-927.
J. C. Wachel et al., "Analysis of Vibration and Failure Problems in Reciprocating Triplex Pumps for Oil Pipelines," The American Society of Mechanical Engineers, Presented at the Energy-Sources and Technology Conference and Exhibition, Dallas, Texas, Feb. 17-21, 1985, 8 pages.
Declaration of Nathaniel E. Frank-White, Internet Archive, Feb. 17, 2022, http://web.archive.org/web/20140329090440/http://www.enidline.com/pdffiles/WR_Catalog_2012.pdf, 82 pages.
Wire Rope Isolator Technologies, Enidine, Dec. 2011, 78 pages.
World's Best Swivel Joints, Flowvalve, 2013, https://web.archive.org/web/20150117041757/http://www.flowvalve.com:80/swivels, 10 pages.

\* cited by examiner

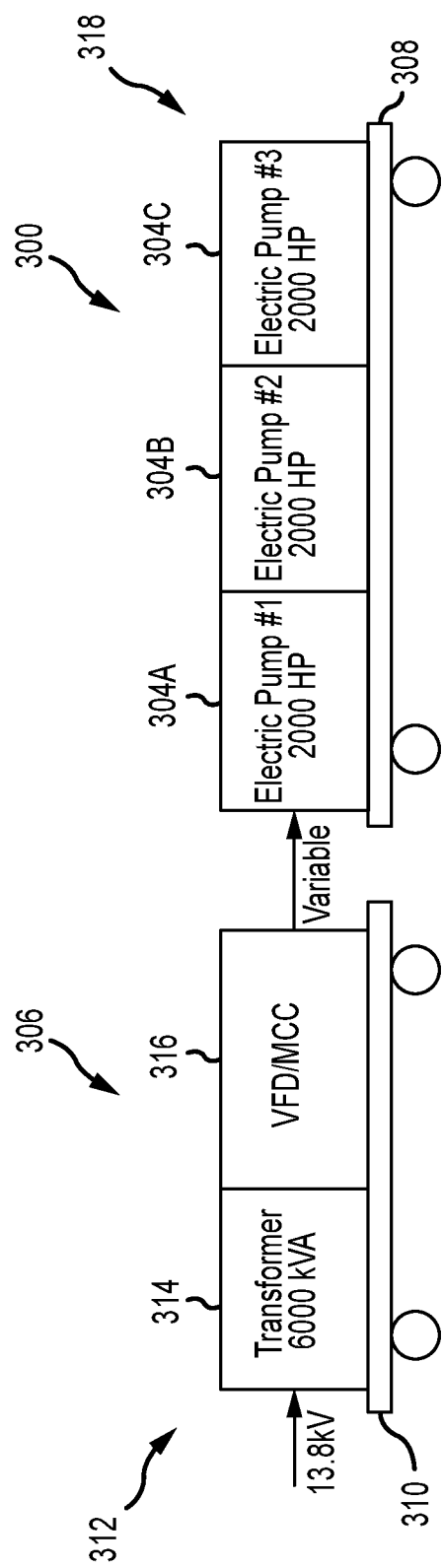
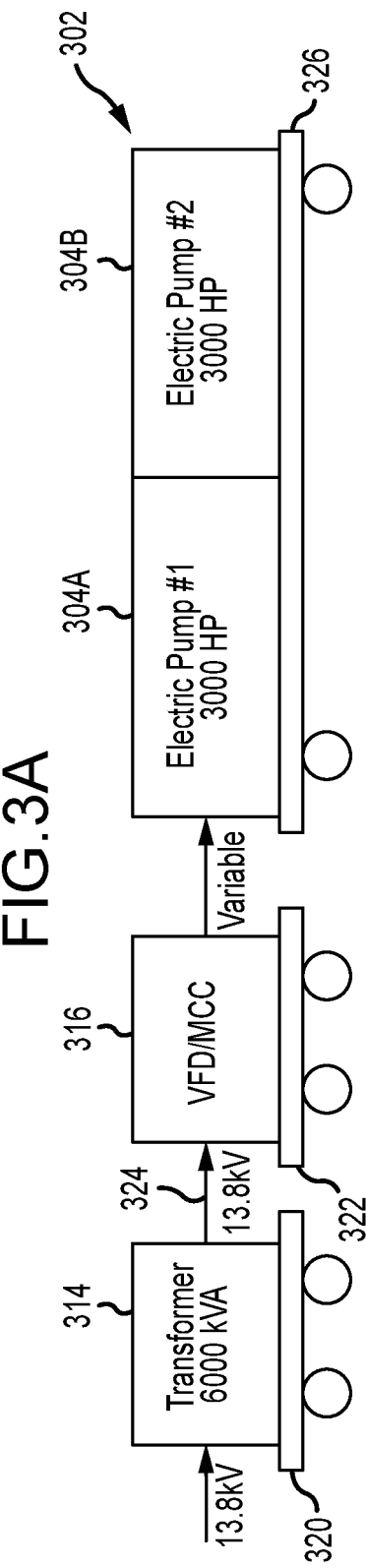
FIG.3A
FIG.3B

HIGH HORSEPOWER PUMPING CONFIGURATION FOR AN ELECTRIC HYDRAULIC FRACTURING SYSTEM

CROSS REFERENCE TO RELATED APPLICATIONS

This application is a continuation of U.S. patent application Ser. No. 16/210,749 filed Dec. 5, 2018 titled "HIGH HORSEPOWER PUMPING CONFIGURATION FOR AN ELECTRIC HYDRAULIC FRACTURING SYSTEM," now U.S. Pat. No. 10,648,311, issued May 12, 2020, and claims priority to and the benefit of U.S. Provisional Application Ser. No. 62/594,925 filed Dec. 5, 2017 titled "HIGH HORSEPOWER PUMPING CONFIGURATION FOR AN ELECTRIC HYDRAULIC FRACTURING SYSTEM" and U.S. Provisional Application Ser. No. 62/595,411 filed Dec. 6, 2017 titled "HIGH HORSEPOWER PUMPING CONFIGURATION FOR AN ELECTRIC HYDRAULIC FRACTURING SYSTEM," the full disclosures of which are hereby incorporated herein by reference in their entirety for all purposes.

BACKGROUND

1. Technical Field

This disclosure relates generally to hydraulic fracturing and more particularly to systems and methods for configuring high horsepower pumping systems.

2. Background

With advancements in technology over the past few decades, the ability to reach unconventional sources of hydrocarbons has tremendously increased. Horizontal drilling and hydraulic fracturing are two such ways that new developments in technology have led to hydrocarbon production from previously unreachable shale formations. Hydraulic fracturing (fracturing) operations typically require powering numerous components in order to recover oil and gas resources from the ground. For example, hydraulic fracturing usually includes pumps that inject fracturing fluid down the wellbore, blenders that mix proppant, chemicals, and the like into the fluid, cranes, wireline units, and many other components that all perform different functions to carry out fracturing operations.

Usually in fracturing systems, the fracturing equipment runs on diesel motors or by other internal combustion engines. Such engines may be very powerful, but have certain disadvantages. Diesel is more expensive, is less environmentally friendly, less safe, and heavier to transport than natural gas. For example, diesel engines are very heavy, and so require the use of a large amount of heavy equipment, including trailers and trucks, to transport the engines to and from a well site. In addition, such engines are not clean, generating large amounts of exhaust and pollutants that may cause environmental hazards, and are extremely loud, among other problems. Onsite refueling, especially during operations, presents increased risks of fuel leaks, fires, and other accidents. The large amounts of diesel fuel needed to power traditional fracturing operations require constant transportation and delivery by diesel tankers onto the well site, resulting in significant carbon dioxide emissions.

Some systems have tried to eliminate partial reliance on diesel by creating bi-fuel systems. These systems blend natural gas and diesel, but have not been very successful. It is thus desirable that a natural gas powered fracturing system be used in order to improve safety, save costs, and provide benefits to the environment over diesel powered systems. Turbine use is well known as a power source, but is not typically employed for powering mobile fracturing operations.

Some electric pumping configurations have a limited horsepower (HP) range, such as between approximately 1750 HP and 2500 HP. This contrasts diesel powered pumping configurations which may include horsepower ranges between 2250 HP and 3000 HP. Fracturing operations with high horsepower configurations which desire the benefits of electric powered pumps typically supplement with smaller diesel powered configurations, which may reduce or eliminate the numerous benefits provided by electric powered pumps. Moreover, rig up times may be increased because two different types of pumping configurations are transported and installed at the well site.

SUMMARY

Applicant recognized the problems noted above herein and conceived and developed embodiments of systems and methods, according to the present disclosure, for operating electric fracturing pumps.

In an embodiment a hydraulic fracturing system for fracturing a subterranean formation includes an electric pump, arranged on a first support structure, the electric pump coupled to a well associated with the subterranean formation and powered by at least one electric motor, and configured to pump fluid into a wellbore associated with the well at a high pressure so that the fluid passes from the wellbore into the subterranean formation and fractures the subterranean formation. The system also includes support equipment, arranged on a second support structure, electrically coupled to the electric pump, wherein the support equipment includes at least a transformer for distributing power to the electric pump, the power being received from at least one generator at a voltage higher than an operating voltage of the electric pump.

In an embodiment a hydraulic fracturing system for fracturing a subterranean formation includes a first support structure, forming a pumping trailer. The first support structure includes an electric pump fluidly connected to a well associated with the subterranean formation and configured to pump fluid into a wellbore associated with the well at a high pressure so that the fluid passes from the wellbore into the subterranean formation and fractures the subterranean formation. The first support structure also includes at least one electric motor providing operational energy to the electric pump. The first support structure further includes a first support component, the first support component regulating operation of the electric pump. The system also includes a second support structure, forming a support trailer. The second support structure includes a second support component, the second support component regulating electric power transmission to the electric pump.

In an embodiment a hydraulic fracturing system for fracturing a subterranean formation includes at least one generator and at least one switch gear receiving electrical power from the generator. The system also includes an electric pump, arranged on a first support structure, the electric pump coupled to a well associated with the subterranean formation and powered by at least one electric motor arranged on the first support structure, the electric pump configured to pump fluid into a wellbore associated with the well at a high pressure so that the fluid passes from the wellbore into the subterranean formation and fractures the subterranean formation. The system also includes a transformer, arranged on a second support structure, positioned between the switch gear and at least one electric motor, the transformer reducing a voltage output from the at least one switchgear.

BRIEF DESCRIPTION OF DRAWINGS

The present technology will be better understood on reading the following detailed description of non-limiting embodiments thereof, and on examining the accompanying drawings, in which:

FIG. 3A is a schematic block diagram of an embodiment of a pumping configuration, in accordance with embodiments of the present disclosure;

FIG. 3B is a schematic block diagram of an embodiment of a pumping configuration, in accordance with embodiments of the present disclosure;

Figure 1:
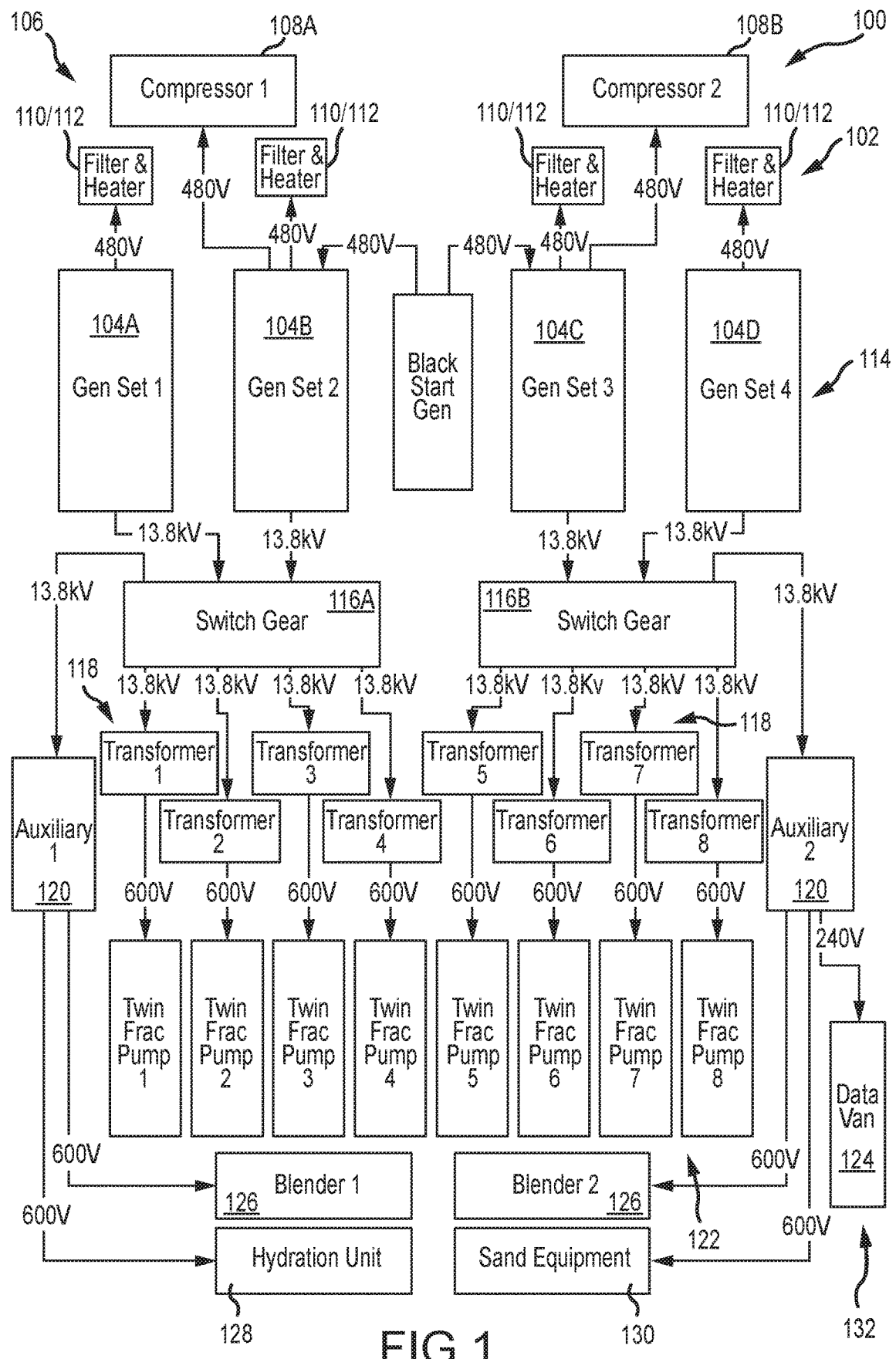
FIG. 1 is a schematic block diagram of an embodiment of a hydraulic fracturing system, in accordance with embodiments of the present disclosure.

While the disclosure will be described in connection with the preferred embodiments, it will be understood that it is not intended to limit the disclosure to that embodiment. On the contrary, it is intended to cover all alternatives, modifications, and equivalents, as may be included within the spirit and scope of the disclosure as defined by the appended claims.

DETAILED DESCRIPTION

The foregoing aspects, features, and advantages of the present disclosure will be further appreciated when considered with reference to the following description of embodiments and accompanying drawings. In describing the embodiments of the disclosure illustrated in the appended drawings, specific terminology will be used for the sake of clarity. However, the disclosure is not intended to be limited to the specific terms used, and it is to be understood that each specific term includes equivalents that operate in a similar manner to accomplish a similar purpose.

When introducing elements of various embodiments of the present disclosure, the articles "a", "an", "the", and "said" are intended to mean that there are one or more of the elements. The terms "comprising", "including", and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment", "certain embodiments", or "other embodiments" of the present disclosure are not intended to be interpreted as excluding the existence of additional embodiments that also incorporate the recited features. Furthermore, reference to terms such as "above", "below", "upper", "lower", "side", "front", "back", or other terms regarding orientation or direction are made with reference to the illustrated embodiments and are not intended to be limiting or exclude other orientations or directions. Additionally, recitations of steps of a method should be understood as being capable of being performed in any order unless specifically stated otherwise. Furthermore, the steps may be performed in series or in parallel unless specifically stated otherwise.

Embodiments of the present disclosure describe systems and methods for various pump configurations to produce greater horsepower (HP) output with a smaller footprint at a well site. In certain embodiments, various components may be arranged on a common support structure, such as a trailer or skid. For example, the trailer may include a transformer, variable frequency drive (VFD), and pump. In such embodiments, the total area available for pumps on the trailer may be decreased due to the support equipment, and as a result, the horsepower output from the pump may be reduced because of its size. In various embodiments, a separate skid or trailer may be utilized for certain support components to thereby enable larger pumps or more pumps to be positioned on the pump trailer to increase the total horsepower output and reduce the number of pump trailers arranged at the well site.

Embodiments of the present disclosure describe systems and methods for pumping configurations utilizing electric powered pumps that produce horsepower greater than or equal to diesel-powered pumping configuration. As described above, diesel-powered systems are noisy and generate pollution. Moreover, transportation of fuel to well sites may be costly and availability of fuel may delay or otherwise bottleneck fracturing operations. In various embodiments, electric pumping configurations include trailers or skids with a pump and a VFD mounted on a single skid or trailer. In certain embodiments, the VFD may be moved to a separate auxiliary skid to increase the room available on the trailer or skid housing the pump. As a result, multiple pumps may be situated on the skid or trailer, or larger pumps may be situated on the skid or trailer. In various embodiments, a single trailer or skid may have a capacity for a 6000+HP output utilizing a variety of configurations such as a single pump with multiple electric motors, a single motor powering a large pump, a large motor powering multiple electric pumps, or the like.

In various embodiments, the pumps utilized with the disclosed configurations may include non-standard fluid ends (e.g., a fluid manifold with valves and seats to isolate a suction side and high pressure discharge side without allowing back flow). By way of example only, the fluid ends may include more than 3 plungers (e.g., triplex) or more than 5 plungers (e.g., quintaplex) or plunger stroke lengths longer than 11 inches. For example, the fluid ends may be septenplex (7 plungers), novenplex (9 plungers), undenplex (11 plungers), tredenplex (13 lungers), or include any other reasonable number of plungers. Size constraints and the like have produced difficulty utilizing such pumps in other systems. However, by adjusting the position of various support equipment for the pumps, such as VFDs, transformers, and motor control centers (MCCs), the trailer or skid may have sufficient size to accommodate larger or non-standard pumps for use with hydraulic fracturing.

In various embodiments, the pumping configurations described herein may include a support skid. This support skid may include auxiliary components for operating the pumps, such as the VFDs, transformers, MCCs, and the like to thereby free up space on the skid or trailer housing the pumps for various additional different configurations, such as more pumps or larger pumps. While referred to herein as "support skids" it should be appreciated that the components associated with the support skids may be mounted on a skid or trailer. That is, the term "support skid" should not be interpreted as limiting the base or support structure to only a skid and other support structures, such as pads, trailers, truck beds, and the like may also be utilized and fall within the scope of the embodiments disclosed herein. Moreover, references to "pump trailers" should be interpreted as including embodiments where the support structure for the pumps and/or associated pumping equipment includes a trailer, a skid, a pad, a truck bed, or any other reasonable support structure.

Various embodiments utilize VFDs in order to control and monitor operation of the electric fracturing pumps. The VFDs may include soft stalls for improved operation. The soft stall allows the VFD to "disengage" the motor for a short amount of time (such as milliseconds) instead of tripping the VFD off to protect the drive and motor. Due to fluctuations in the wellhead pressure and pump fluid rate, if the VFD is near its upper limitations on torque a small fluctuation of pressure can cause the VFD to "trip" or shut down to protect itself to prevent damage. The soft stalls allow the VFD to stall temporarily then reengage the motor instead of shutting down completely. These "soft stalls" are unnoticed by the operator and are so quick that total fluid rate is not affected. This feature allows operation of the VFDs and motors at higher horsepower without fear of suffering an unexpected shutdown. Rated hydraulic horsepower (HHP) may be increased from 1, 600 HP to 1,700 HP. In various embodiments, the soft stall is a software setting implemented as an executable instruction stored on a non-transitory machine readable memory and initiated by an associated processor of a control system.

FIG. 1 is a simplified block diagram of an embodiment of a hydraulic fracturing system 100. In the illustrated embodiment, a power generation section 102 includes four turbine generators 104A-D arranged to produce electrical energy at approximately 13.8 kV and generate more than approximately 20 MW of power depending on demand, size, and the like. That is, different types of generators may be arranged at the well site and produce different quantities of electrical energy. For instance, the generators may produce electrical energy at approximately 600 V, 4,160 V, or any other reasonable voltage output. Furthermore, different sizes of generators may be utilized in order to accommodate size and space restrictions at the well site. The illustrated embodiment further includes support equipment 106 for the turbine generators 104A-D, such as compressors 108, filters 110, heaters 112, and the like. It should be appreciated that other equipment, such as electronic equipment rooms and the like, have been omitted for clarity.

The illustrated embodiment further includes a power distribution section 114 including switch gears 116A, 116B for protection and distribution, as well as step down transformers 118 and auxiliary units 120. As shown, the generators 104A-D produce electrical energy at 13.8 kV for transmission to the switch gear 116A, 116B. Thereafter, the step down transformers 118 receive and convert the energy to 600 V, which is distributed to pumps 122. As shown, the auxiliary units 120 are utilized to step down the energy for the associated fracturing equipment, such as a data van 124, blender 126, a hydration unit 128, and sand equipment 130. In various embodiments, the auxiliary units may include transformers to step down the energy to 600 V, 240 V, or any other reasonable voltage output.

Continuing with FIG. 1, the illustrated embodiment further includes hydraulic fracturing equipment, such as the illustrated pumps 122, data van 124, blenders 126, hydration unit 128, and sand equipment 130. It should be appreciated that various components have been simplified and/or removed for clarity. Moreover, the embodiment illustrated in FIG. 1 is not intended to be limiting. For instance, more than 8 twin frac pumps may be arranged at the well site. Moreover, multiple data vans, blenders, sand equipment, and hydration units may be utilized. The illustrated pumps 122 are twin frac pumps. The twin frac pumps may be arranged on a common skid or trailer and receive energy from the transformers 118. It should be appreciated that the pumps 122 may be configured to operate at different voltages, such as 600 V, 13.8 kV, 4,160 V, or any reasonable voltage. Moreover, in embodiments the pumps 122 may be singular pumps mounted on a trailer or skid. However, in embodiments that utilize the twin frac pumps, the trailer or skid may include two fully independent, electrically powered fluid pumps. In various embodiments, the illustrated fleet is capable of generating approximately 16,000 HP for fracturing jobs. As will be described below, different configurations, for example of the pumps, may enable more than approximately 20,000 HP.

Figure 2:
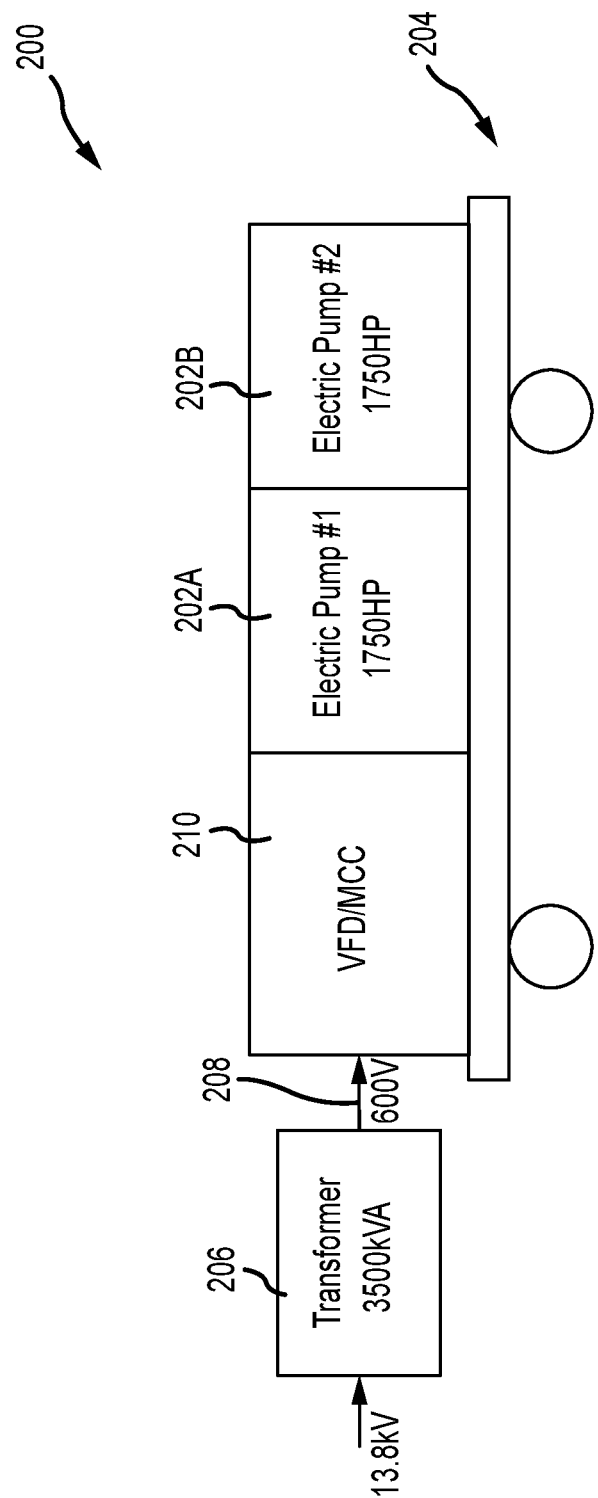
FIG. 2 is a schematic block diagram of an embodiment of a pumping configuration, in accordance with embodiments of the present disclosure.

FIG. 2 is a schematic diagram of an embodiment of a twin frac pump trailer 200. It should be appreciated that twin frac pumps 202A, 202B may also be arranged on a skid, pad, bed, or any other reasonable support structure 204. As illustrated, a transformer 206 steps down electrical energy from 13.8 kV to 600 V and may be rated for approximately 3500 kVA. The 600 V power is transmitted to the pumps 202A, 202B, for example via cabling 208, through a VFD and MCC 210. In various embodiments, the VFD and MCC 210 are arranged on the same support structure 204 (e.g., trailer, skid, pad, bed, etc.) as the dual electric fracturing pumps illustrated in FIG. 2. It should be appreciated that while the VFD and MCC 210 are illustrated as a single unit in the illustrated embodiment, in other embodiments the VFD and MCC may be separate and distinct units, which may not be both arranged on the support structure 204. The illustrated pumps 202A, 202B produce approximately 1,750 HP, which allows for the trailer to have a combined output of approximately 3,500 HP. It should be appreciated that various components have been eliminated for clarity. For example, each fluid pump 202A, 202B may include an electric motor, motor cooling equipment, a power end, a lube oil cooler, a fluid end, and the like. In embodiments, the additional equipment may be arranged on the same support structure 204. However, in various embodiments, the additional equipment may be on an auxiliary or separate support structure.

In various embodiments, hydraulic fracturing jobs may utilize upwards of 28,000 HP. Accordingly, utilizing the configuration illustrated in FIG. 2 would lead to approximately 8 twin frac pump trailers 200 at the site, as illustrated in FIG. 1. This configuration may take up significant space, which may be limited at various fracturing sites. Moreover, mobilizing and demobilizing the equipment may be time consuming. Accordingly, various embodiments disclosed herein may be utilized to produce more horsepower per pump trailer to thereby reduce the number of pump trailers at the site.

FIGS. 3A and 3B are schematic diagrams of embodiments of frac pump trailer configurations 300, 302 which may produce approximately 6,000 HP. As shown in FIG. 3A, pumps 304A, 304B, 304C and the support equipment 306 have been separated onto two different support structures 308, 310, for example two different trailers. A first trailer 312 includes a transformer 314 for stepping down the 13.8 kV voltage. As described above, in various embodiments the voltage may be stepped down to 600 V, however it should be appreciated that different output voltages may be utilized. The first trailer 312 also includes the VFD/MCC 316 for controlling operation of the electric motor powering the pumps. As noted above, the VFD/MCC 316 may be integrated into a singular unit or may be separate and distinct units. FIG. 3A also illustrates a second trailer 318 having three electric pumps 304A-C. The illustrated pumps are rated for approximately 2,000 HP each, thereby providing a configuration to produce approximately 6,000 HP. The embodiment illustrated in FIG. 3A may include various cabling and instrumentation permanently mounted to the first trailer 312 for supporting the transformer 314 and VFD/MCC 316. As a result, connections may be simplified at the site because separate cabling and the like will not be run between the transformer 314 and the VFD/MCC 316. Moreover, simplified connections via power cables may be used to transmit power to the electric pumps 304A-C, thereby reducing the likelihood of misconnections at the well site and improving reliability.

FIG. 3B illustrates a configuration in which the transformer and VFD/MCC are on different support structures, such as different skids or trailers. For example, the illustrated transformer 314 is arranged separate from the VFD/MCC 316, for example on different support structures 320, 322. Accordingly, cabling 324 and the like may be arranged between the transformer 314 and the VFD/MCC 316 to enable transmission of electrical energy. Furthermore, illustrated on a separate support structure 326 such as a trailer or skid, is a pair of electric pumps 304A, 304B rated for approximately 3,000 HP. Because there are fewer pumps 304A, 304B on the trailer 326, compared to FIG. 3A, larger pumps may be utilized, which enables the pump trailer 302 to produce approximately 6,000 HP total. Accordingly, using the embodiments illustrated in FIGS. 3A and 3B, producing approximately 28,000 HP will utilize approximately 5 trailers, as opposed to 8, for example using the configuration of FIG. 2. As a result, the system may have a smaller footprint at the site and also have less equipment to connect, disconnect, and move.

Figure 4A:
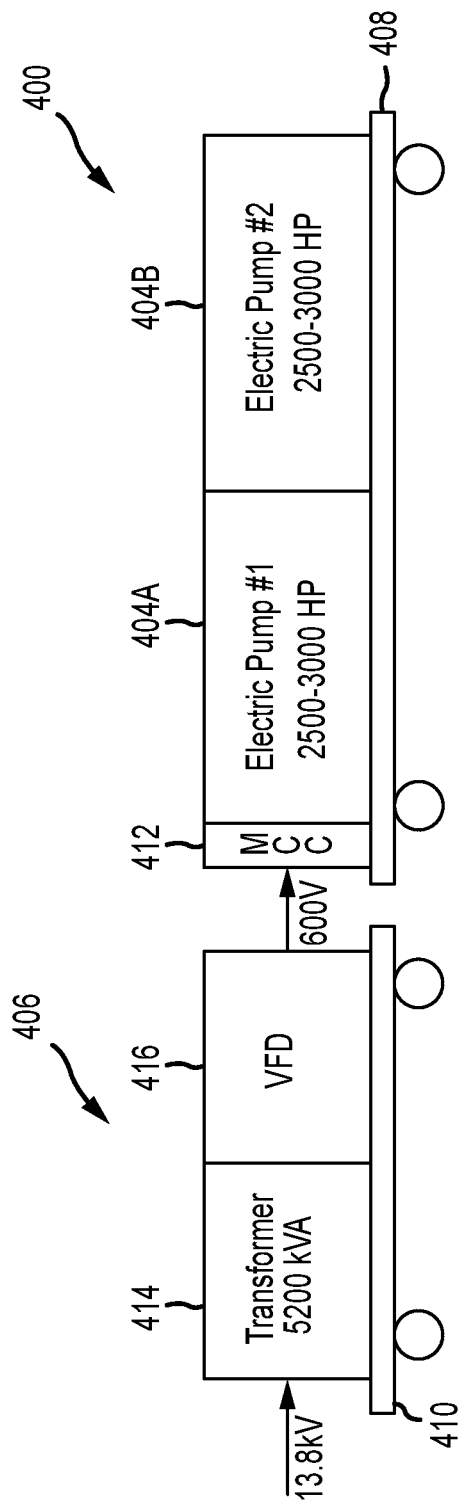
FIG. 4A is a schematic block diagram of an embodiment of a pumping configuration, in accordance with embodiments of the present disclosure.
Figure 4B:
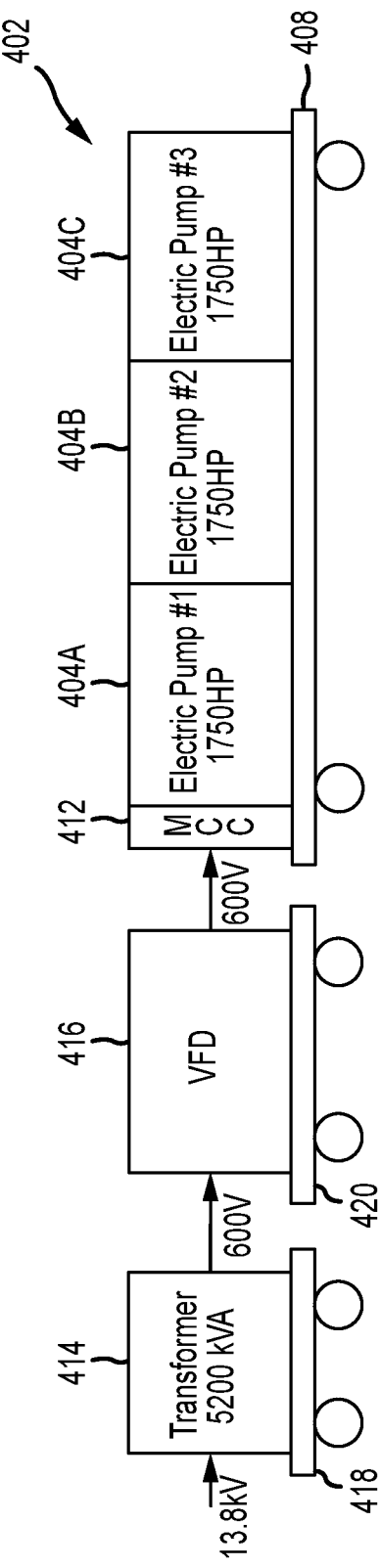
FIG. 4B is a schematic block diagram of an embodiment of a pumping configuration, in accordance with embodiments of the present disclosure.

FIGS. 4A and 4B are schematic diagrams of embodiments of frac pump trailer configurations 400, 402 which may produce approximately 5,000-6,000 HP. As shown in FIG. 4A, the pumps 404A, 404B and the support equipment 406 have been substantially separated onto two different support structures 408, 410, for example two different trailers. A notable difference from FIG. 3A is the inclusion of an MCC 412 on the trailer 408 supporting the pair of pumps 404A, 404B, rather than on the trailer 410 for the support equipment 406. While this configuration occupies additional space on the pump trailer, it enables improved and efficient cable management and increase electrical safety. With the MCC 412 on the pump trailer 408, only power and some communication cables will be used between the auxiliary trailers and the pump trailers. In various embodiments, the MCC 416 will include breakers to distribute power to equipment components both large and small. In various embodiments, the equipment may include lights, heaters, blowers, small pumps, control computers, motors, and the like.

In the illustrated embodiment, the support structure 410 with the support equipment 406 (which may be referred to as a support trailer) includes a transformer 414 for stepping down the 13.8 kV energy. As described above, in various embodiments the voltage may be stepped down to 600 V, however it should be appreciated that different output voltages may be utilized. The support trailer also includes a VFD 416 for controlling operation of the electric motor or motors (not shown) powering the pumps 404A, 404B. FIG. 4A also illustrates the support structure 408 with the pumps 404A, 404B (which may be referred to as a pump trailer), as described above. The pump trailer includes the pair of electric pumps 404A, 404B and the MCC 412. The illustrated pumps 404A, 404B are rated for approximately 2,500-3,000 HP each, thereby providing a configuration to produce approximately 5,000-6,000 HP. As described above, because there are only two pumps on the trailers the pumps may be larger and therefore capable of producing additional power output.

FIG. 4B illustrates the configuration in which the transformer 414 and VFD 416 are on different support structures, 418, 420 such as different skids or trailers. Additionally, the MCC 412 is mounted on the same trailer 408 as the pumps 404A-C, as described above with respect to FIG. 4A. For example, the illustrated transformer 414 is arranged separate from the VFD 416, for example on different support structures 418, 420. Accordingly, cabling and the like may be arranged between the transformer 414 and the VFD 416 to enable transmission of electrical energy. Furthermore, illustrated on the separate support structure 408, such as a trailer or skid, is three electric pumps 404A-C rated for approximately 1,750 HP and the MCC 412. Because there are more pumps 404A-C on the trailer 408, each pump 404A-C may be smaller than configurations with fewer pumps. Additionally, as described above, the MCC 412 occupies space on the trailer, but provides improved and efficient cabling. The embodiment illustrated in FIG. 4B may produce approximately 5,250 HP. Accordingly, using the embodiments illustrated in FIGS. 4A and 4B, producing approximately 28,000 HP will utilize approximately 5 or 6 trailers, as opposed to 8. As a result, the system may have a smaller footprint at the site and also have less equipment to connect, disconnect, and move.

Figure 5:
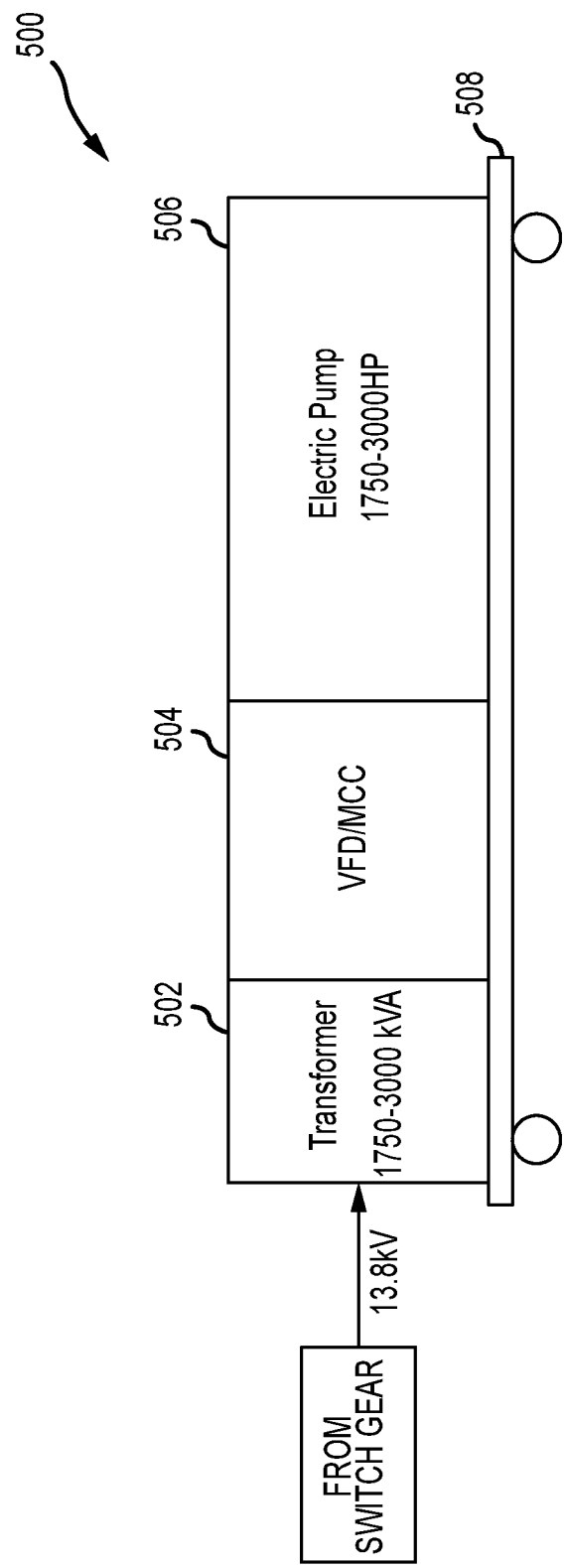
FIG. 5 is a schematic block diagram of an embodiment of a pumping configuration, in accordance with embodiments of the present disclosure.

FIG. 5 is a schematic diagram of an embodiment of a frac pump trailer configuration 500 which may produce approximately 3,000 HP. In the illustrated embodiment, a transformer 502, VFD/MCC 504, and electric pump 506 are all located on a common support structure 508, such as a trailer or skid. Because of the support equipment arranged on the trailer 508, the size of the pump 506 may be reduced, and therefore produces between approximately 1,750 and 3,000 HP. The configuration illustrated in FIG. 5 enables permanent cabling to be installed on the trailer to facilitate connection at the well site. For example, power may be transmitted to the trailer from the switch gear, as illustrated in FIG. 5. Accordingly, the embodiment illustrated in FIG. 5 provides a compact and simplified configuration at the well site.

Figure 6:
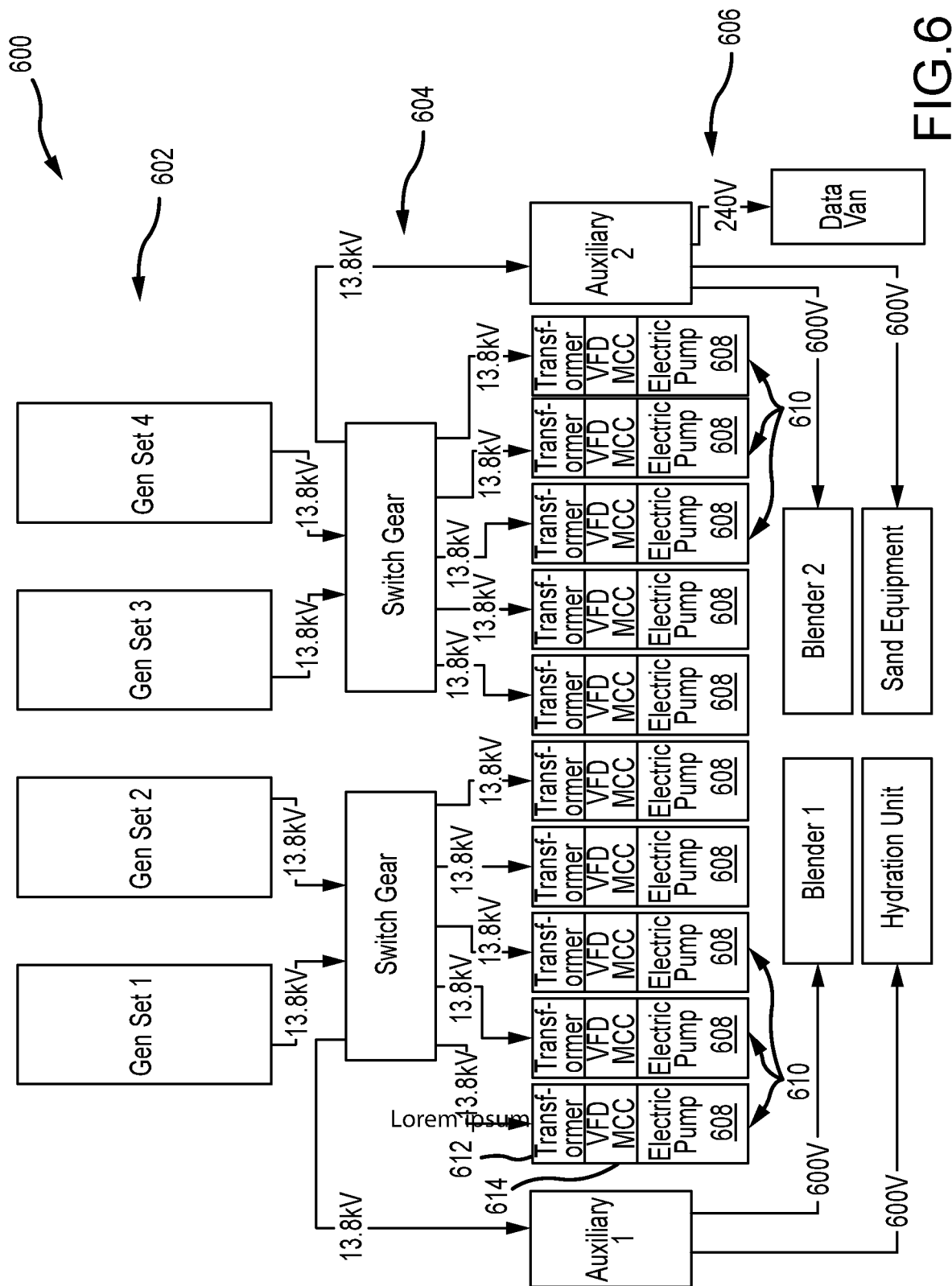
FIG. 6 is a schematic block diagram of an embodiment of a hydraulic fracturing system, in accordance with embodiments of the present disclosure.

FIG. 6 is a schematic diagram of an embodiment of a hydraulic fracturing system 600 including a power generation section 602, a power distribution section 604, and hydraulic fracturing equipment 606. The illustrated embodiment includes hydraulic fracturing pumps 608, for example mounted on a common trailer or skid 610 with a transformer 612 and VFD and MCC 614, in a configuration to produce approximately 30,000 HP. As illustrated, there are 10 different frac pump trailers 610, which may have the same configuration illustrated in FIG. 5. By incorporating the embodiment illustrated in FIG. 5, the separate transformers illustrated in FIG. 1 have been removed because the transformers 612 are already included with the pump trailers 610. Accordingly, a more compact configuration may be arranged at the well site.

Figure 7:
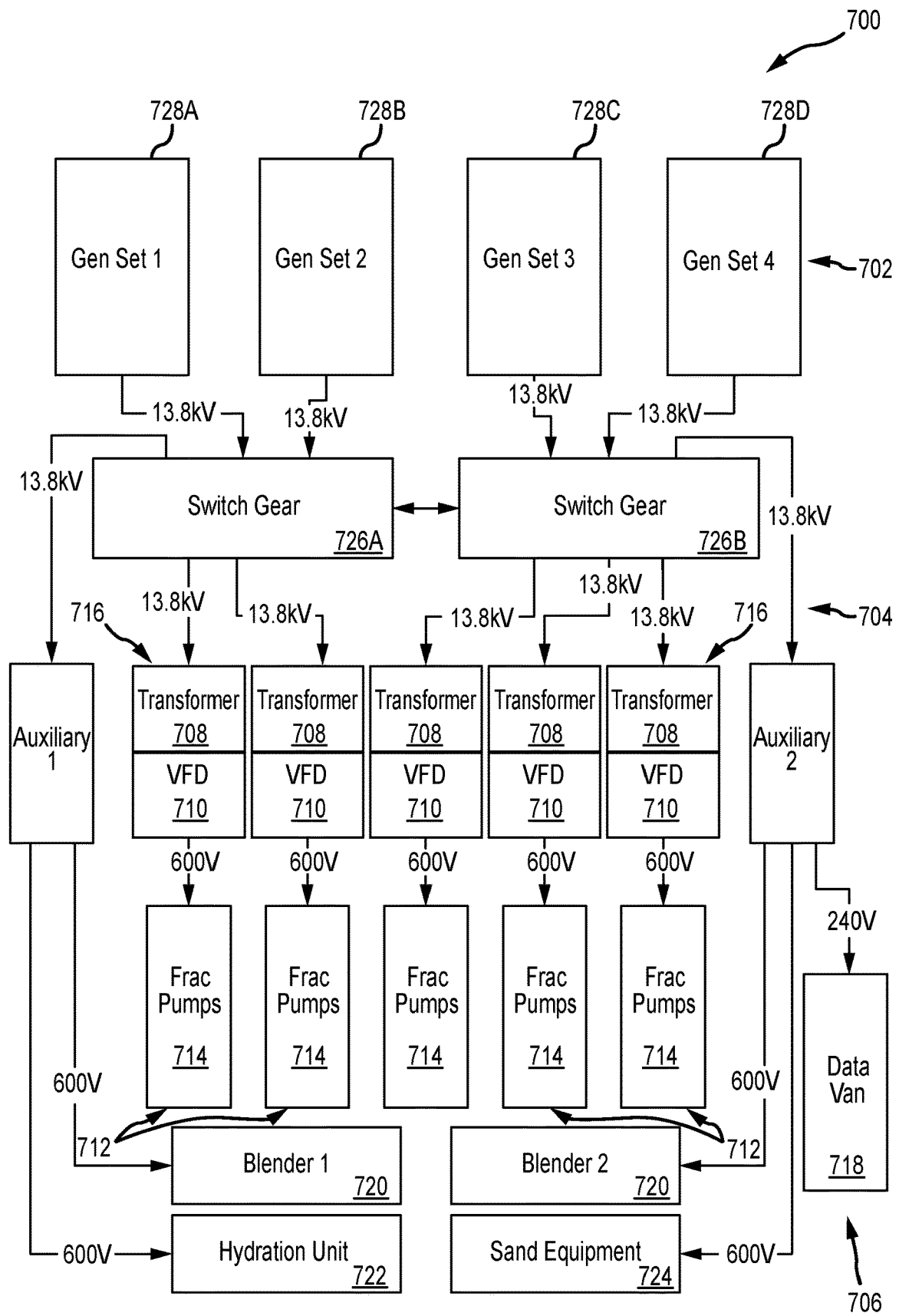
FIG. 7 is a schematic block diagram of an embodiment of a hydraulic fracturing system, in accordance with embodiments of the present disclosure.

FIG. 7 is a schematic diagram of an embodiment of a hydraulic fracturing system 700 including a power generation section 702, a power distribution section 704, and hydraulic fracturing equipment 706, as described in detail above. The illustrated embodiment may produce approximately 30,000 HP. As shown, a transformer 708 and VFD 710 are removed from the frac pump trailers 712 that support one or more pumps 714 and are supported separately, for example via a separate trailer or skid 716. In various embodiments, the MCC may be incorporated into the trailer 712 supporting the pumps 714 or the trailer 716 supporting the transformer 708 and VFD 710, as described above. As shown, the illustrated configuration includes 5 frac pump trailers, and in various embodiments a single large pump on the frac pump trailer 712r, a pair of frac pumps, three frac pumps, or any reasonable number in order to produce the particularly selected amount of horsepower. The illustrated embodiment further includes the auxiliary units for supplying electrical energy to the support equipment, such as the data van 718, blenders 720, hydration unit 722, and sand equipment 724, as described above.

Further illustrated in the power distribution section 704 is load sharing between the switch gear 726 to keep the load balanced across the generators 728A-D. This balance may be achieved even though there are an unequal number of pump trailers utilized in the system. That is, a first switch gear 726A may transmit energy to two different frac pump trailers and a second switch gear 726b may transmit energy to three different frac pump trailers.

It should be appreciated that various embodiments of the components of the present disclosure may utilize a variety of equipment in order to achieve a desired end. For example, the pumps described herein may be magnetic coil, reciprocating, centrifugal, positive displacement, rotary (e.g., gear pumps, screw pumps, rotary vane pumps), progressing cavity, roots-type, peristaltic, plunger, hydraulic ram, velocity, or any other reasonable type of pumps. Moreover, the VFDs may be housed within an enclosure having an internal air conditioned space for technicians. In various embodiments, the VFD enclosures may no longer be a "house" and rather be panels that are weather and oil-field condition proof (e.g., blast proof, water proof, dust proof, etc.). Accordingly, the size of the housing may be decreased as the technicians may access the exterior panels while standing beside the trailers or skids.

Various embodiments may include a support skid, trailer, or body load, as described above, to free up space on the pump trailers (e.g., pump skid, pump pad, etc.) for additional pumps and/or larger pumps. As described above, it should be appreciated that references to a "support skid" may also refer to a support trailer, a support pad, a body load, or any other reasonable configuration. By way of example only, the support skid may include a main transformer, such as a step down transformer to take power down from 13.8 kV on the primary side (e.g., inlet) to 4,160 V on the secondary side (e.g., outlet). Furthermore, the transformer and/or support skid may include a bus, which may be common or separate, to feed the VFD and the MCC.

Figure 8A:
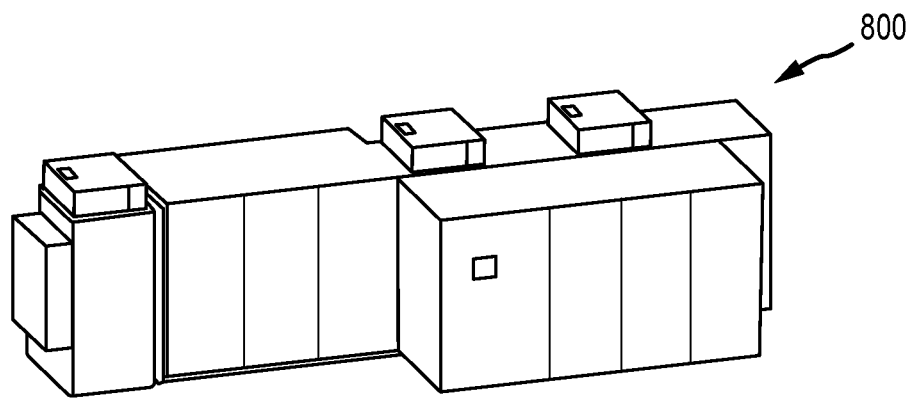
FIG. 8A is a schematic perspective view of an embodiment of an enclosure, in accordance with embodiments of the present disclosure.
Figure 8B:
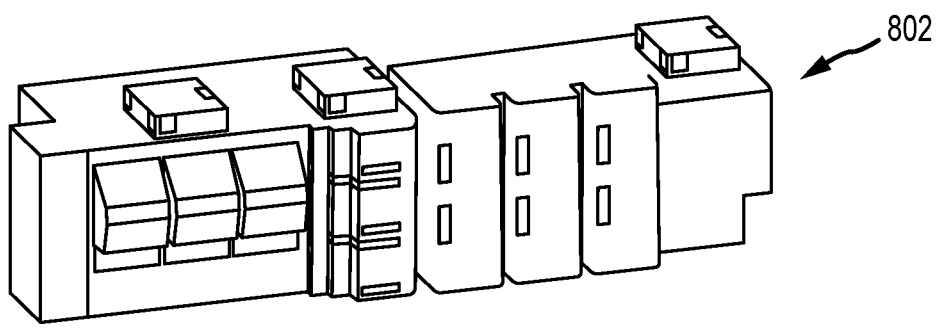
FIG. 8B is a schematic perspective view of an embodiment of an enclosure, in accordance with embodiments of the present disclosure.

FIGS. 8A and 8B are schematic perspective views of embodiments of enclosures 800, 802 for VFD assemblies. As described above, in various embodiments the VFDs may be housed within enclosures that include weather-proof and/or oil field condition-proof configurations, such as being blast proof or dust proof. The illustrated embodiment includes an outdoor medium voltage adjustable speed drive and an advanced enclosure design and power section topology. Namely, the illustrated embodiments are particularly designed for mounting in remote locations, such as harsh environments including desert or oil-field conditions. It should be appreciated that alternative embodiments may not have an integrated outdoor enclosure.

Figure 9:
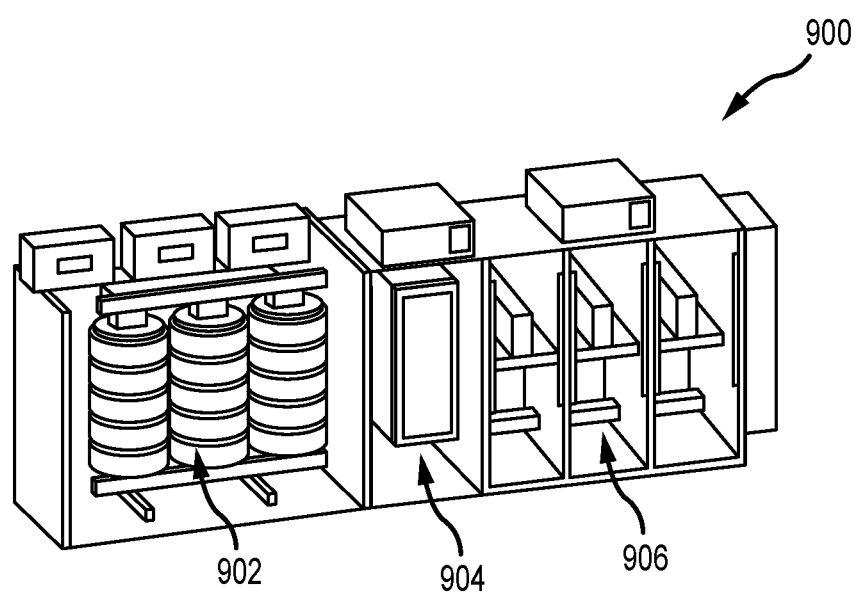
FIG. 9 is a partial schematic perspective view of an embodiment of an enclosure, in accordance with embodiments of the present disclosure.

FIG. 9 is a schematic partial perspective view of the enclosure for the VFD assembly 900 illustrating the transformer section 902, rectifier/control section 904, and inverter/output section 906. In various embodiments, the VFD assembly 900 may include one or more features or controls to enable low harmonics, meeting or exceeding IEEE 519-2014 specifications. Moreover, the VFD assembly 900 may further enable a higher true power factor (e.g., greater than 0.95) than configurations that run motors across the line. In various embodiments, an advanced user interface design enables operators to interact with the VFD assembly 900 to control or monitor operations.

In various embodiments, the VFD assembly 900 may operate in temperatures from −45 degrees C. to 50 degrees C., thereby providing flexibility in operations. Moreover, the VFD assembly 900 may be configured to enable operation with standard motors without the need for special motor insulation or cables. In order to provide predictability in operations, the VFD assembly 900 may be designed with a ten-year mean time between failures, thereby enabling operators to plan for maintenance activities.

Furthermore, in various embodiments the VFD assembly 900 incorporates an enclosure cooling system (not pictured) with a combination of air-to-air heat exchangers along with forced air cooling of the power modules. Utilizing a totally enclosed cooling system where no (or nearly no) exchange of internal air and external air occurs enables the internal drive components to remain clean and uncontaminated from the environment, which may include pollutants or dust. Accordingly, the costs and challenges associated with filter maintenance to keep the pollutants or dust out of the enclosure are eliminated.

Embodiments of the VFD assembly 900 further include a copper-wound input isolation transformer that provides 36 pulse phase-shift harmonic cancellation that meets or exceeds IEEE 519-2014. This isolation transformer may function similarly to a linear load on the incoming AC line.

The soft charge reactor on the primary side of the isolation transformer maximizes the longevity of the transformer and minimizes the in rush current on weak grid systems.

Additionally, embodiments of the VFD assembly 900 further include a five-level NPC PWM output that closely simulates a true sine wave, which minimizes motor failures caused by insulation stress and long lead-length issues. The output waveform topology may be suitable for use on existing non-inverter duty motors without upgrading the motor insulation system.

In various embodiments, the VFD assembly 900 utilizes advanced IGBT technology with robust multi-level topology and controls with a fast industrial processor. Furthermore, an LCD Electronic Operator Interface enables quick, user-friendly programming. In various embodiments, faults are logged containing date and time steps. Furthermore, programming inputs and outputs are included to meet specific application needs. Moreover, the VFD assembly 900 may further include software to capture, extract, and compress full operating data at the time of a fault. This track-back data allows users to capture data with ease for detailed fault analysis, which can be submitted for remote diagnostics and support. In various embodiments, the VFD assembly 900 and associated software will include functional capabilities to communicate with one or more of DeviceNet, EtherNet/IP, Modbus RTU, Modbus TCP, Profibus, Tosline-S20, TCNet, and Ethernet Global Data (EGD).

In various embodiments, the VFD assembly 900 may further include features to streamline operations or provide improved diagnostic information. These features may include, communication cards, door-mounted equipment such as meters, pilot lights, speed potentiometer, and switches, direct online bypass, motor protection relay, RTD monitor, dV/dt or sine wave output filters, a solid state starter bypass, and multiple motors synchronous transfer and capture. Furthermore, features such as synchronous motor control (AC Brushless/DC Brush Type) and drive and motor space heater may also be incorporated. Additionally, an optional walk-in enclosure for power electronic components may be utilized. In embodiments, the VFD assembly may also include a voltage source inverter (VSI) with V/f Control and PID control and induction motor sensorless vector control synchronous motor sensorless Vector Control, and Closed Loop Vector Control (Using Pulse Generator Encoder or Resolver).

As described above, in various embodiments the VFD is utilized to control the one or more motors that operate the electric frac pumps. Specifications for the VFDs may include 3,500 HP-6,000 HP drive (one embodiment would be two 3,500 HP drives powering two 3,000-3,500 HP pumps) (another embodiment would be one 6,000 HP drive powering one 6,000 HP pump), output frequency of 0-120 HZ, and a control method including a five-level pulse-width modulation (PWM) output control with neutral-point clamping (NPC). Additionally, the VFD may include V/Hz Control such as V/Hz, sensorless vector control, variable torque, closed-loop vector control, and constant torque. In embodiments the VFD has a rotary encoder integrated into EOI. The VFD may also be used to protect the motor and/or the pumps via current limits, overcurrent, overload, undervoltage, overvoltage, ground fault, CPU error, and soft stall. In certain embodiments, the VFD may include speed regulation in the open loop up to 0.5% and the closed loop up to 0.1%. Further the VFD may include an overload current rating of 100% continuous or 115% for one minute every 20 minutes.

As described above, the VFD assembly may be operable via a control interface that enables operators to monitor and control the VFDs. The VFD control interface may include digital input, such as ten discrete inputs with programmable functions. It may also include digital output, such as ten available digital programmable outputs. In various embodiments, the VFD control interface includes analog input, such as three selectable currents (0/4 to 20 mA) or voltage (0-10 VDC) input signals. It may also include analog outputs, such as three to eight selectable output current (0/4 to 20 mA) or voltage (0-10 VDC). In certain embodiments, the control interface further includes communication ports, for example, Profibus, Modbus RTU & TCP, TOSLINE-S20, TCNet, Ethernet Global Data (EGD), DeviceNet & EtherNet/IP. Furthermore, the control interface may include safety features such as a standard pad-lockable input fuse disconnect switch with vacuum contactor, interlocked doors, and viewing window.

Furthermore, in various embodiments, each VFD will also be able to be controlled remotely via a wired or wireless control from the hydraulic fracturing data van control module or a remote suitcase. Moreover, a local display may be included. In embodiments, the local display is a 4-digit, 7-segment LED display and 4×20 character graphical plain English back-lit LCD display for programming, monitoring, and diagnostics. Furthermore, local LED indicators may be included, such as run (red)/stop (green) and local (green). Additionally, embodiments may incorporate local keys, such as local/remote, enter, mon/Prg, Esc, Run, and Stop/Reset, and monitoring. The monitoring may relay information to a frequency command screen, and display parameters such as motor current, motor speed, motor voltage, dc voltage, input voltage, output voltage, run time, output power, motor kW, motor kWH, motor kVAH, motor kVAR, and on-time Control power. In various embodiments, the above-described outdoor enclosure is NEMA 3R, free standing, and provides front-access only. Additionally, the outdoor enclosure may have bottom-entry power cables for input as well as the above-described forced-air cooling. In various embodiments, components of the present disclosure comply with standards and compliances such as NEC, NEMA, UL, ULC, ANSI, & American Recovery & Reinvestment Act Compliant.

Figure 10:
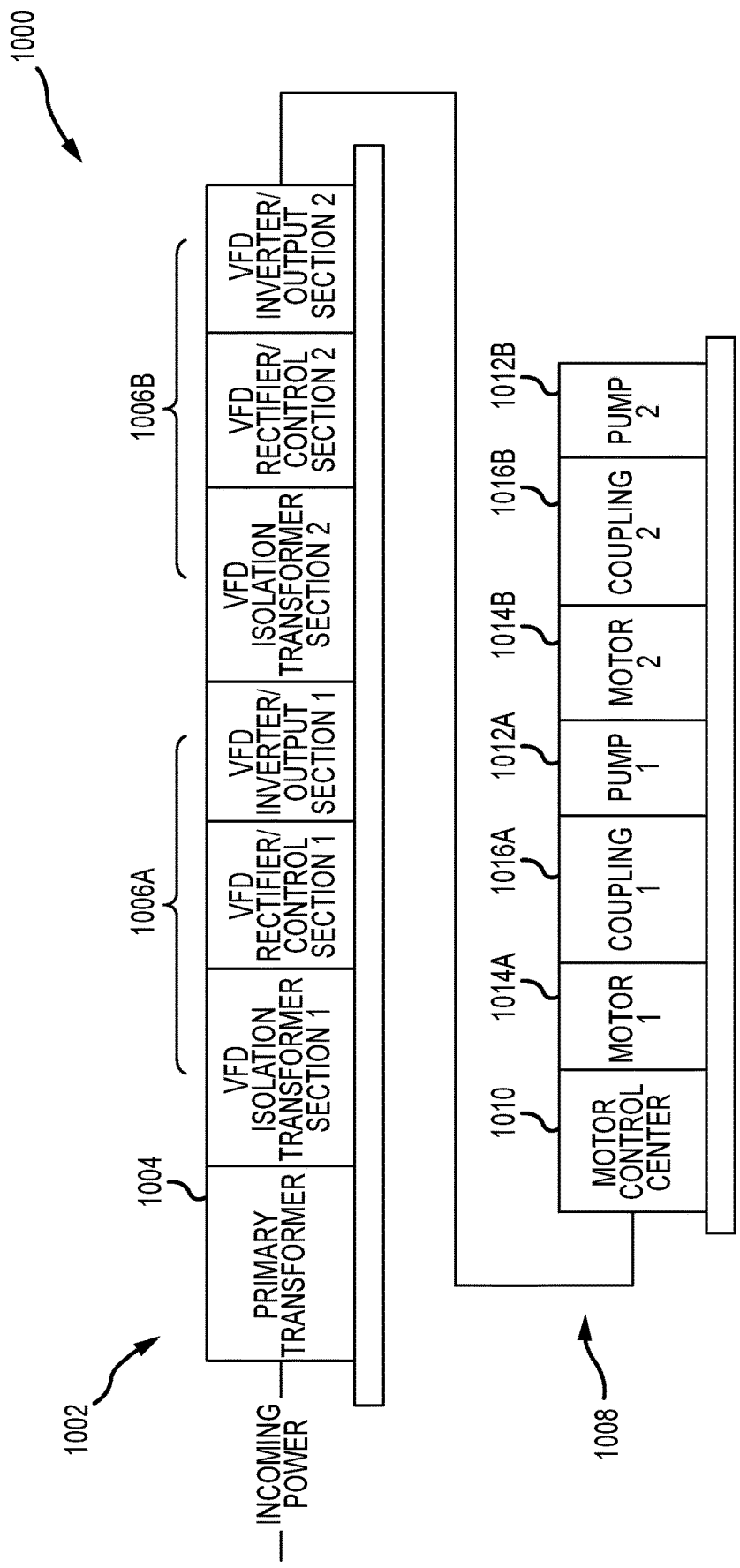
FIG. 10 is a schematic block diagram of an embodiment of a pumping configuration, in accordance with embodiments of the present disclosure.

FIG. 10 is a schematic diagram of an embodiment of a power distribution configuration 1000. In the illustrated embodiment, a first trailer or skid 1002, which may be referred to as a support skid, includes a primary transformer 1004 and two VFDs 1006A, 1006B. As shown, the VFDs each include a VFD isolation transformer, a VFD rectifier/control, and a VFD inverter/output. This support skid supplies electrical energy to a second trailer or skid 1008, which may be referred to as a frac pump trailer, that includes an MCC 1010 and a pair of pumps 1012A, 1012B with associated motors 1014A, 1014B and couplings 1016A, 1016B. The pair of pumps 1012A, 1012B may each be rated at or about 3,000 HP. In the illustrated embodiment, each VFD 1006A, 1006B of the support skid 1002 is utilized to control and monitor operations of a respective motor 1014A, 1014B powering one of the pumps 1012A, 1012B on the frac pump trailer 1008. Accordingly, as described above, there is additional space available on the frac pump trailer 1008, due to the removal of elements such as the transformer or VFDs, and therefore more or larger pumps may be arranged on the frac pump trailer 1008.

Figure 11:
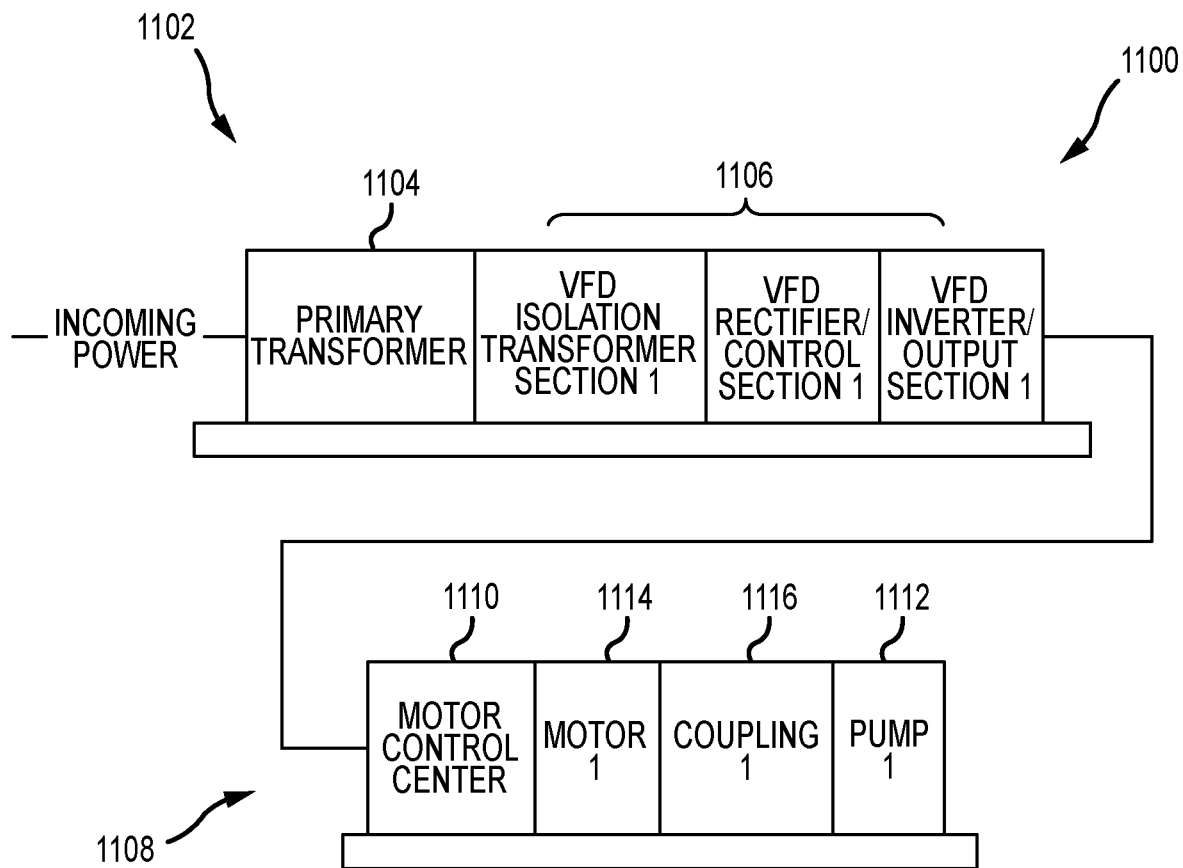
FIG. 11 is a schematic block diagram of an embodiment of a pumping configuration, in accordance with embodiments of the present disclosure.

FIG. 11 is a schematic diagram of an embodiment of a power distribution and pumping configuration 1100. The illustrated embodiment includes the first trailer 1102, which may be a support skid, having the primary transfer 1104 and a VFD 1106. The illustrated VFD 1106 includes the isolation transformer section, the rectifier/control section, and the inverter/output section. The support skid 1102 supplies power and controls the motor of the second trailer 1108, which may be a frac pump trailer. The illustrated frac pump trailer 1108 includes the MCC 1110 and a single pump 1112, which further includes a motor 1114 and coupling 1116. The illustrated pump 1112 may be rated for 6,000 HP. As described above, removing one or more components from the frac pump trailer enables larger pumps. Compared to the embodiment illustrated in FIG. 10 with the dual pumping configuration, the embodiment illustrated in FIG. 11 may have a larger pump having a larger horsepower capability.

It should be appreciated that while various embodiments described herein discuss voltages such as 4,160 V or 13.8 kV that other voltages may be utilized. For example, other options may include 600 V, 480 V, 240 V, or any other voltage that may be utilized commercially. Frequency can be approximately 50 Hz or 60 Hz. Moreover, in embodiments, the turbine generators may each produce approximately 5.7 MW of electricity. However, other turbine generators producing less electricity or more electricity may be utilized. Additionally, it should be appreciated that the power can be broken up into one or more banks. Moreover, in embodiments, the generators and/or the equipment may be particularly selected based on the power output or generate of the other. For example, in embodiments the generators may produce power at 4,160 V and the associated equipment may also operate at 4,160 V. In other embodiments, the generators may produce power at 600 V and the associated equipment may also operate at 600 V. In other embodiments, the generators may produce power at 13.8 kV and the associated equipment may also operate at 13.8 kV. Additionally, as described above, various transformers may be utilized to step down voltages to enable equipment operating at different voltages to be incorporated into various pumping configurations.

The present disclosure described herein, therefore, is well adapted to carry out the objects and attain the ends and advantages mentioned, as well as others inherent therein. While a presently preferred embodiment of the disclosure has been given for purposes of disclosure, numerous changes exist in the details of procedures for accomplishing the desired results. These and other similar modifications will readily suggest themselves to those skilled in the art, and are intended to be encompassed within the spirit of the present disclosure disclosed herein and the scope of the appended claims.

The invention claimed is:

1. A hydraulic fracturing system, comprising:
    a plurality of electric pumps, arranged on a first support structure, the plurality of electric pumps coupled to a well associated with a subterranean formation and powered by at least one electric motor, the plurality of electric pumps configured to pump fluid into a wellbore associated with the well;
    a variable frequency drive (VFD), arranged on a second support structure, electrically coupled to at least one pump of the plurality of electric pumps, wherein the VFD comprises:
        a VFD isolation transformer;
        a VFD rectifier; and
        a VFD inverter;
    a control system, arranged on the second support structure, and configured to control one or more operational parameters of at least one pump of the plurality of electric pumps; and
    a transformer, arranged on a third support structure, and configured to distribute electrical power to at least one of the plurality of electric pumps, the VFD, or the control system, the transformer positioned to receive, from at least one generator, power at a voltage higher than a respective operating voltage of the at least one pump of the plurality of electric pumps, the VFD, or the control system.

2. The system of claim 1, wherein each of the first support structure, the second support structure, and the third support structure are separate and distinct.

3. The system of claim 1, wherein at least one of the first support structure, the second support structure, or the third support structure is a trailer, a skid, a pad, a truck bed, or a combination thereof.

4. The system of claim 1, wherein the VFD controls the speed of the at least one electric motor.

5. The system of claim 1, wherein the VFD and the control system are positioned within a common housing.

6. The system of claim 1, wherein the plurality of electric pumps have a combined horsepower of between 5,000 and 6,000 horsepower.

7. A hydraulic fracturing system, comprising:
    a first support structure, comprising:
        a plurality of electric pumps electric pumps coupled to a well associated with a subterranean formation; and
        at least one electric motor configured to supply operational energy to at least one electric pump of the plurality of electric pumps;
    a second support structure, comprising:
        a variable frequency drive (VFD), electrically coupled to the at least one electric motor, wherein the VFD comprises:
            a VFD isolation transformer;
            a VFD rectifier; and
            a VFD inverter; and
        a control system configured to control one or more operational parameters of at least one pump of the plurality of electric pumps; and
    a third support structure, comprising:
        a transformer configured to distribute electrical power to at least one of the plurality of electric pumps, the VFD, or the control system, the transformer positioned to receive, from at least one generator, power at a voltage higher than a respective operating voltage of the at least one pump of the plurality of electric pumps, the VFD, or the control system.

8. The system of claim 7, wherein at least one of the first support structure, the second support structure, or the third support structure is a trailer, a skid, a pad, a truck bed, or a combination thereof.

9. The system of claim 7, wherein the VFD controls the speed of the at least one electric motor.

10. The system of claim 7, wherein the VFD and the control system are positioned within a common housing.

11. The system of claim 7, wherein the plurality of electric pumps have a combined horsepower of between 5,000 and 6,000 horsepower.

12. The system of claim 7, wherein the VFD further comprises:
    a human-machine interface configured to receive operational controls.

13. The system of claim 7, wherein the VFD is positioned within an enclosure with a cooling system, the cooling system comprising:
    an air-to-air heat exchanger; and
    forced air cooling;

wherein the cooling system is an enclosed cooling system configured to limit exchange of air internal to the enclosure and air external to the enclosure.

14. A hydraulic fracturing system, comprising:
at least one generator;
at least one switch gear receiving electrical power from the generator;
a plurality of electric pumps, arranged on a first support structure, the plurality of electric pumps coupled to a well associated with a subterranean formation and powered by at least one electric motor, the plurality of electric pumps configured to pump fluid into a wellbore associated with the well;
a variable frequency drive (VFD), arranged on a second support structure, electrically coupled to the at least one electric motor, wherein the VFD is positioned within an enclosure with a cooling system, the cooling system comprising:
an air-to-air heat exchanger; and
forced air cooling;
wherein the cooling system is an enclosed cooling system configured to limit exchange of air internal to the enclosure and air external to the enclosure;
a control system, arranged on the second support structure, and configured to control one or more operational parameters of at least one pump of the plurality of electric pumps; and
a transformer, arranged on a third support structure, and configured to distribute electrical power to at least one of the plurality of electric pumps, the VFD, or the control system, the transformer positioned to receive, from the at least one generator and the at least one switch gear, power at a voltage higher than a respective operating voltage of the at least one pump of the plurality of electric pumps, the VFD, or the control system.

15. The system of claim 14, wherein the first support structure, the second support structure, and the third support structure are separate components arranged remote from and not in contact with one another.

16. The system of claim 14, wherein at least one of the first support structure, the second support structure, or the third support structure is a trailer, a skid, a pad, a truck bed, or a combination thereof.

17. The system of 17, wherein the VFD and the control system are positioned within the enclosure.

18. The system of claim 14, wherein the plurality of electric pumps have a combined horsepower of between 5,000 and 6,000 horsepower.

* * * * *